(12) United States Patent
Somaiya et al.

(10) Patent No.: US 11,640,408 B2
(45) Date of Patent: May 2, 2023

(54) SEARCH GUIDANCE

(71) Applicant: eBay Inc., San Jose, CA (US)

(72) Inventors: Manas Haribhai Somaiya, Sunnyvale, CA (US); Rabi Chakraborty, Sunnyvale, CA (US); Nirveek De, Mountain View, CA (US); Akshata Baliga, San Jose, CA (US); Corey Demarco, Sunnyvale, CA (US); Jian Xu, San Jose, CA (US); Sudeep Dasgupta, Cupertino, CA (US); Meenal Varshney, Cupertino, CA (US); Ganesh Gopalakrishnan, San Jose, CA (US); Dennis Marshall, San Ramon, CA (US)

(73) Assignee: EBAY INC., San Jose, CA (US)

( * ) Notice: Subject to any disclaimer, the term of this patent is extended or adjusted under 35 U.S.C. 154(b) by 220 days.

(21) Appl. No.: 16/413,549

(22) Filed: May 15, 2019

(65) Prior Publication Data

US 2019/0340173 A1 Nov. 7, 2019

Related U.S. Application Data

(63) Continuation of application No. 14/200,913, filed on Mar. 7, 2014, now abandoned.
(Continued)

(51) Int. Cl.
*G06F 16/248* (2019.01)
*G06F 16/28* (2019.01)
(Continued)

(52) U.S. Cl.
CPC .......... *G06F 16/248* (2019.01); *G06F 16/285* (2019.01); *G06F 16/338* (2019.01); *G06F 16/951* (2019.01); *G06Q 30/08* (2013.01)

(58) Field of Classification Search
CPC .... G06F 16/248; G06F 16/285; G06F 16/338; G06F 16/951; G06Q 30/08
See application file for complete search history.

(56) References Cited

U.S. PATENT DOCUMENTS

| 5,835,965 A | 11/1998 | Taylor et al. |
| 5,838,965 A | 11/1998 | Kavanagh et al. |
| (Continued) | | |

FOREIGN PATENT DOCUMENTS

| CN | 102063468 A | 5/2011 |
| CN | 102955821 A | 3/2013 |
| (Continued) | | |

OTHER PUBLICATIONS

Non Final Office Action received for U.S. Appl. No. 15/212,073, dated Jan. 21, 2020, 14 pages.
(Continued)

*Primary Examiner* — Matthew J Ellis
(74) *Attorney, Agent, or Firm* — Shook, Hardy & Bacon L.L.P.

(57) ABSTRACT

A user may submit a search query to a search engine, which may process the search query and generate a set of results. Previous actions of the user or of other users may be used to identify recommended search queries. The recommended search queries may be presented to the user along with the search results for the query. The location of the recommended search queries may be fixed, set by the user, or determined on a query-by-query basis. A user interface element operable to cause the presentation of one or more recommended search queries may be presented after a delay. After an additional or independent delay, the recommended search queries may be presented automatically. The delays may be fixed, set by the user, or determined on a query-by-query basis.

20 Claims, 22 Drawing Sheets

Related U.S. Application Data

(60) Provisional application No. 61/899,814, filed on Nov. 4, 2013, provisional application No. 61/880,771, filed on Sep. 20, 2013.

(51) Int. Cl.
    *G06F 16/951*     (2019.01)
    *G06F 16/338*     (2019.01)
    *G06Q 30/08*     (2012.01)

(56) References Cited

U.S. PATENT DOCUMENTS

| | | | |
|---|---|---|---|
| 6,078,916 | A | 6/2000 | Culliss |
| 8,548,981 | B1* | 10/2013 | Bhattacharjee ..... G06F 16/3322 707/713 |
| 8,566,339 | B2 | 10/2013 | Jammalamadaka |
| 8,583,675 | B1* | 11/2013 | Haahr ................. G06F 16/9535 707/767 |
| 8,874,555 | B1 | 10/2014 | Kim et al. |
| 10,922,327 | B2 | 2/2021 | Somaiya et al. |
| 11,222,064 | B2 | 1/2022 | Kale et al. |
| 2006/0026147 | A1* | 2/2006 | Cone ................... G06F 16/9535 |
| 2006/0064411 | A1 | 3/2006 | Gross et al. |
| 2007/0055616 | A1 | 3/2007 | Clay et al. |
| 2007/0180401 | A1 | 8/2007 | Singh et al. |
| 2007/0198488 | A1 | 8/2007 | Altounian et al. |
| 2007/0250901 | A1 | 10/2007 | Mcintire et al. |
| 2008/0114622 | A1 | 5/2008 | Crean et al. |
| 2009/0119254 | A1 | 5/2009 | Cross et al. |
| 2009/0125435 | A1 | 5/2009 | Cohen et al. |
| 2009/0132340 | A1 | 5/2009 | Demir et al. |
| 2009/0240683 | A1* | 9/2009 | Lazier ................. G06F 16/3325 707/999.005 |
| 2011/0119754 | A1* | 5/2011 | Larsen ...................... G06F 8/61 726/16 |
| 2012/0005045 | A1 | 1/2012 | Baker |
| 2012/0047134 | A1 | 2/2012 | Hansson et al. |
| 2012/0047135 | A1* | 2/2012 | Hansson ........... G06F 16/90324 707/E17.084 |
| 2012/0197751 | A1 | 8/2012 | Zatkin et al. |
| 2013/0053005 | A1 | 2/2013 | Ramer et al. |
| 2013/0067364 | A1 | 3/2013 | Berntson et al. |
| 2013/0080423 | A1 | 3/2013 | Parikh et al. |
| 2013/0086509 | A1* | 4/2013 | Satyanarayana .... G06F 16/3322 715/781 |
| 2013/0254308 | A1* | 9/2013 | Rose .................... H04N 21/252 709/206 |
| 2014/0143268 | A1* | 5/2014 | Finkelstein ......... G06F 16/3322 707/767 |
| 2014/0244629 | A1* | 8/2014 | Huang ................. H04L 51/046 707/723 |
| 2015/0088921 | A1 | 3/2015 | Somaiya et al. |
| 2015/0161256 | A1* | 6/2015 | Jeh ...................... G06F 16/3334 707/707 |
| 2016/0328459 | A1 | 11/2016 | Somaiya et al. |
| 2017/0193011 | A1 | 7/2017 | Kale et al. |
| 2017/0193636 | A1 | 7/2017 | Kita |

FOREIGN PATENT DOCUMENTS

| | | |
|---|---|---|
| CN | 103778227 A | 5/2014 |
| CN | 104866474 A | 8/2015 |
| WO | 2015/032670 A1 | 3/2015 |
| WO | 2017/116691 A1 | 7/2017 |

OTHER PUBLICATIONS

Applicant Initiated Interview Summary received for U.S. Appl. No. 15/212,073, dated Mar. 30, 2020, 3 pages.
Advisory Action received for U.S. Appl. No. 14/985,913, dated Apr. 9, 2020, 2 pages.
Final Office Action received for U.S. Appl. No. 14/985,913, dated Feb. 1, 2019, 9 pages.
Final Office Action received for U.S. Appl. No. 14/985,913, dated Jan. 8, 2020, 9 pages.
Non Final Office Action received for U.S. Appl. No. 14/985,913, dated Jun. 15, 2020, 9 pages.
Non-Final Office Action received for U.S. Appl. No. 14/985,913, dated Jul. 5, 2018, 12 pages.
Non-Final Office Action received for U.S. Appl. No. 14/985,913, dated Jun. 28, 2019, 9 pages.
Response to Final Office Action filed on Apr. 8, 2020, for U.S. Appl. No. 14/985,913, dated Jan. 8, 2020, 10 pages.
Response to Final Office Action filed on Mar. 5, 2020, for U.S. Appl. No. 14/985,913, dated Jan. 8, 2020, 10 pages.
Response to Final Office Action filed on May 1, 2019, for U.S. Appl. No. 14/985,913, dated Feb. 1, 2019, 9 pages.
Response to Non-Final Office Action filed on Oct. 5, 2018, for U.S. Appl. No. 14/985,913, dated Jul. 5, 2018, 16 pages.
Response to Non-Final Office Action filed on Sep. 26, 2019, for U.S. Appl. No. 14/985,913, dated Jun. 28, 2019, 10 pages.
Notice of Allowance received for U.S. Appl. No. 15/212,073, dated Sep. 2, 2020, 13 pages.
Response to Non-Final Office Action filed on Apr. 21, 2020, for U.S. Appl. No. 15/212,073, dated Jan. 21, 2020, 16 pages.
Communication Pursuant to Article 94(3) EPC received for European Patent Application No. 16882307.8, dated Apr. 2, 2020, 7 pages.
Extended European Search Report received for European Patent Application No. 16882307.8, dated May 28, 2019, 11 pages.
Response to Communication Pursuant to Article 94(3) filed on Jul. 10, 2020, for European Patent Application No. 16882307.8, dated Apr. 2, 2020, 15 pages.
Response to Extended European Search Report filed on Sep. 23, 2019, for European Patent Application No. 16882307.8, dated May 28, 2019, 19 pages.
Bossard et al., "Apparel Classification with Style", Retrieved from the Internet URL :<http://www.vision.ee.ethz.ch/~lbossard/bossard_accv12_apparel-classification-with-style.pdf>, © Springer-Verlag Berlin Heidelberg, 2012, pp. 321-335.
International Preliminary Report on Patentability received for PCT Application No. PCT/US2016/066387, dated Jul. 12, 2018, 7 pages.
Applicant—Initiated Interview Summary received for U.S. Appl. No. 15/212,073 dated Sep. 9, 2019, 3 pages.
Final Office Action received for U.S. Appl. No. 15/212,073, dated Nov. 5, 2019, 15 pages.
Response to Non-Final Office Action filed on Sep. 18, 2019, for U.S. Appl. No. 15/212,073, dated Jun. 3, 2019, 13 pages.
International Search Opinion received for PCT Patent Application No. PCT/US2016/066387, dated Feb. 23, 2017, 2 pages.
Written Opinion received for PCT Patent Application No. PCT/US2016/066387, dated Feb. 23, 2017, 5 pages.
Final Office Action Received for U.S. Appl. No. 14/985,913 dated Dec. 24, 2020, 10 pages.
Notice of Allowance received for U.S. Appl. No. 15/212,073, dated Oct. 9, 2020, 12 pages.
Applicant Initiated Interview summary received for U.S. Appl. No. 14/200,913, dated Dec. 17, 2018, 3 pages.
Applicant Initiated Interview Summary received for U.S. Appl. No. 14/200,913, dated Oct. 4, 2016, 3 pages.
Applicant Initiated Interview Summary received for U.S. Appl. No. 14/200,913, dated Oct. 26, 2017, 3 pages.
Applicant Initiated Interview summary received for U.S. Appl. No. 14/200,913, dated Apr. 2, 2019, 3 pages.
Applicant Initiated Interview Summary received for U.S. Appl. No. 14/200,913, dated Jun. 7, 2017, 3 pages.
Applicant Interview Summary received for U.S. Appl. No. 14/200,913, dated Mar. 27, 2018, 3 pages.
Final Office Action received for U.S. Appl. No. 14/200,913, dated May 31, 2018, 17 pages.
Final Office Action received for U.S. Appl. No. 14/200,913, dated Aug. 9, 2017, 18 pages.
Final Office Action received for U.S. Appl. No. 14/200,913, dated Feb. 15, 2019, 18 pages.

(56) References Cited

OTHER PUBLICATIONS

Final Office Action received for U.S. Appl. No. 14/200,913, dated Sep. 9, 2016, 17 pages.
Non-Final Office Action for U.S. Appl. No. 14/200,913, dated Dec. 13, 2017, 21 pages.
Non-Final Office Action received for U.S. Appl. No. 14/200,913, dated Feb. 26, 2016, 14 pages.
Non-Final Office Action received for U.S. Appl. No. 14/200,913, dated Mar. 7, 2017, 20 pages.
Non-Final Office Action received for U.S. Appl. No. 14/200,913, dated Sep. 28, 2018, 18 pages.
Response to Final Office Action filed on Oct. 27, 2017 for U.S. Appl. No. 14/200,913, dated Aug. 9, 2017, 14 pages.
Response to Final Office Action filed on Sep. 29, 2016 for U.S. Appl. No. 14/200,913, dated Sep. 9, 2016, 9 pages.
Response to Non- Final Office Action filed on Dec. 28, 2018, for U.S. Appl. No. 14/200,913, dated Sep. 28, 2018, 15 pages.
Response to Non-Final Office Action filed on Apr. 18, 2018, for U.S. Appl. No. 14/200,913, dated Dec. 13, 2017, 19 pages.
Response to Non-Final Office Action filed on Jun. 7, 2017 for U.S. Appl. No. 14/200,913 dated Mar. 7, 2017, 10 pages.
Response to Non-Final Office Action filed on May 26, 2016 for U.S. Appl. No. 14/200,913 dated Feb. 26, 2016, 10 pages.
Advisory Action received for U.S. Appl. No. 15/212,073, dated Jun. 29, 2018, 3 pages.
Applicant Initiated Interview Summary received for U.S. Appl. No. 15/212,073, dated Nov. 7, 2017, 3 pages.
Final Office Action received for U.S. Appl. No. 15/212,073, dated Mar. 29, 2018 27 pages.
Non-Final Office Action received for U.S. Appl. No. 15/212,073, dated Jul. 12, 2017, 15 pages.
Non-Final Office Action received for U.S. Appl. No. 15/212,073, dated Jun. 3, 2019, 14 pages.
Notice to Non-Compliant or Non-Responsive amendment received for U.S. Appl. No. 15/212,073, dated Jul. 19, 2018, 3 pages.
Response to Advisory Action filed on Jul. 30, 2018, for U.S. Appl. No. 15/212,073, dated Jun. 29, 2018, 27 pages.
Response to Final Office Action filed on May 25, 2018, for U.S. Appl. No. 15/212,073, dated Mar. 29, 2018, 21 pages.
Response to Final Office Action filed on Jun. 29, 2018 for U.S. Appl. No. 15/212,073 dated Mar. 29, 2018, 19 pages.
Response to Non-Final Office Action filed on Oct. 12, 2017, for U.S. Appl. No. 15/212,073, dated Jul. 12, 2017, 17 pages.
Supplemental Response or Amendment to Non-Final Office Action filed on Oct. 31, 2017, for U.S. Appl. No. 15/212,073, dated Jul. 12, 2017, 15 pages.
Booker, "Information Week: Why Recommendation Engines Are About to Get Much Better", Retrieved from the Internet: <URL: http://www.informationweek.com/bigdata/ big-data-analytics/why-recommendation-engines-are-about-to-get-much-better/d/did/1111646?print-yes&page_number>, Sep. 23, 2013, 3 pages.
Gaughran, "Understanding Amazon's Recommendation Engine: Making Indie-Publishing a Mission Possible", Retrieved from the Internet: <URL: http://www.indierecon.org/2014/02/understanding-amazons recommendation.html>, Feb. 27, 2014, 4 pages.
Jones, et al., "Generating Query Substitutions", Proceedings of the 15th international conference on World Wide Web, 2006, 10 pages.
Applicant Initiated Interview Summary received for U.S. Appl. No. 15/212,073, dated Dec. 13, 2019, 3 pages.
Response to Final Office Action filed on Dec. 31, 2019, for U.S. Appl. No. 15/212,073, dated Nov. 5, 2019, 14 pages.
Advisory Action received for U.S. Appl. No. 14/985,913, dated Mar. 23, 2021, 3 Pages.
Summons To Attend Oral Proceeding received for European Patent Application No. 16882307.8, mailed on Oct. 5, 2021, 10 pages.
Office Action received for Chinese Patent Application No. 201680081916.1, dated Jul. 28, 2021, 11 pages (10 pages of official copy and 1 page of English translation).
Office Action Received for Chinese Patent Application No. 201680081916.1, dated Jan. 4, 2022, 10 pages (8 pages of official copy and 2 pages of English translation).
Notice of Allowance received for U.S. Appl. No. 14/985,913, dated Sep. 2, 2021, 9 pages.

* cited by examiner

SEARCH GUIDANCE

CLAIM OF PRIORITY UNDER 35 U.S.C. § 119(e)

This application is a Continuation of U.S. patent application Ser. No. 14/200,913 filed Mar. 7, 2014, entitled "SEARCH GUIDANCE," which itself claims priority to U.S. Provisional Application No. 61/880,771 filed Sep. 20, 2013, entitled "Search Guidance," and to U.S. Provisional Application No. 61/899,814 filed Nov. 4, 2013, entitled "Search Guidance Helper Drawer." The entire contents of each of the foregoing applications are hereby incorporated by reference as if fully set forth herein.

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright eBay, Inc. 2013-14, All Rights Reserved.

TECHNICAL FIELD

The subject matter disclosed herein generally relates to the processing of data. Specifically, in some example embodiments, the present disclosure addresses systems and methods for providing search guidance.

BRIEF DESCRIPTION OF THE DRAWINGS

Some embodiments are illustrated by way of example and not limitation in the figures of the accompanying drawings.

DETAILED DESCRIPTION

Figure 1:
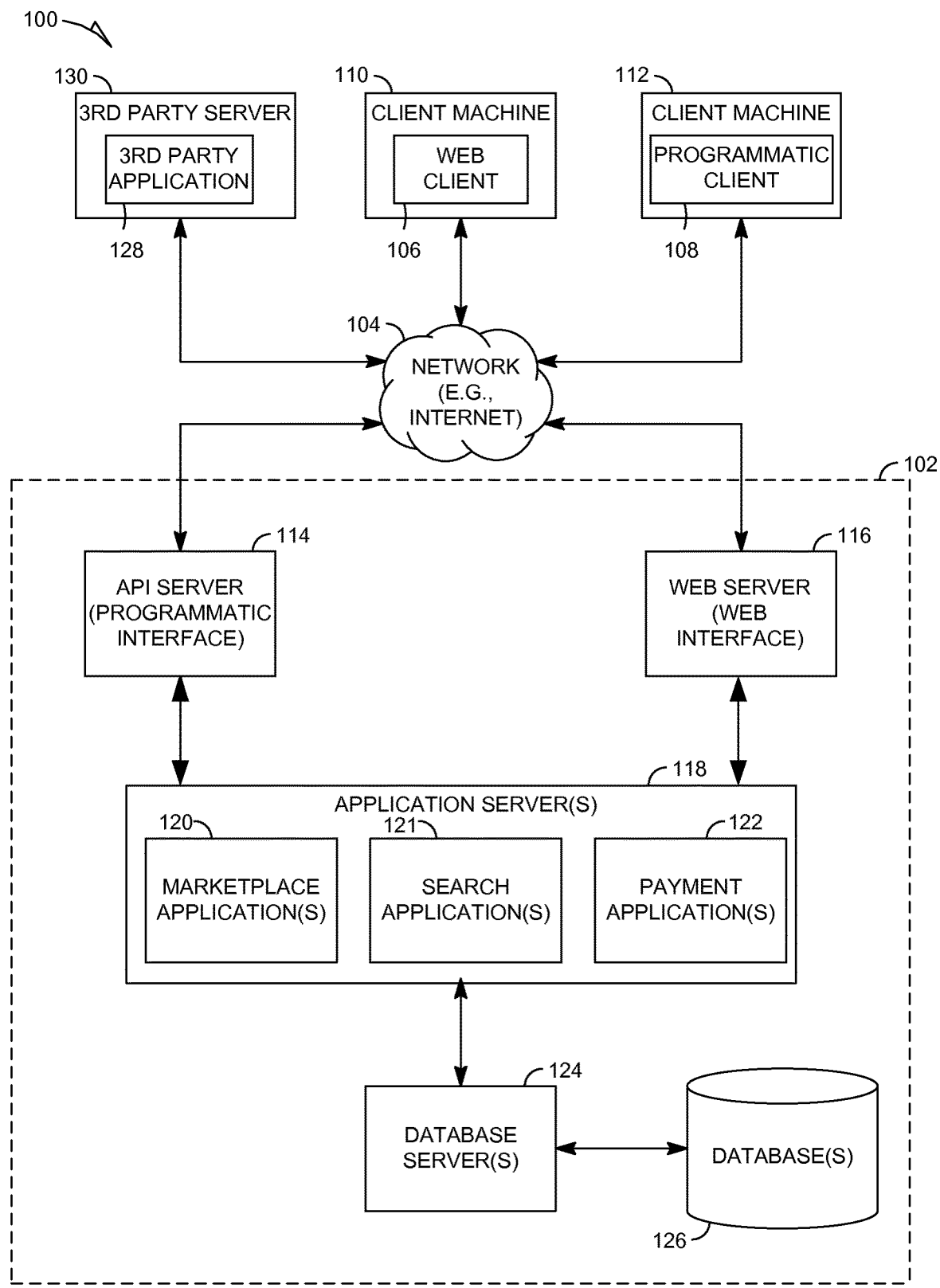
FIG. 1 is a network diagram illustrating a network environment suitable for search guidance, according to some example embodiments.

Example methods and systems are directed to search guidance. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

As described in more detail below, a database of user actions taken after submitting a search query may be created. The actions may be used to recommend search queries to later users submitting the same search query. The recommended search queries may include modifications to the search query that are likely to encourage the later user to interact with a search result.

A user may submit a search query to a search engine (e.g., a search application running on an application server). The search engine may process the search query and generate a set of results. Results generated by different search engines for the same search query may be different. For example, one search engine may be geared to providing image results while another is geared to providing shopping results. Continuing with this example, submitting a search query comprising "purse" to the two engines could result in an image of a purse from the first engine and a link to a purse retailer from the second engine.

The search query may have been run before by other users, and the actions of the other users taken in response to receiving a result set for the search query may have been recorded. For example, a database of prior user actions taken after submitting the search query may have been created. The actions of the other users may be used to identify recommended search queries. The recommended search queries may include modifications to the search query that are likely to encourage the present user to interact with a search result. For example, if the search query is "digital camera," and many users that search for a digital camera refine the search to "digital camera black" before interacting with an item, "digital camera black" may be a recommended search query. A number of recommended search queries may be generated. The number of generated search queries may be a constant (e.g., 4), set by the user (e.g., in a preference), or determined on a query-by-query basis.

The recommended search queries may be presented to the user along with the search results for the query. The recommended search queries may be positioned on a screen at a location. The location may be fixed (e.g., the bottom of the screen, at the top of the search results, after the 10th search result, etc.), set by the user, or determined on a query-by-query basis. For example, other users who have submitted the search query may frequently interact with one of the first five results presented or else choose to stop searching or to submit a new search. Based on this, the recommended search queries may be presented after the fifth result. The recommended search queries may also be hidden unless the location is hovered over by the user. For example, the recommended queries may be available for access from the bottom or right-hand side of the screen, but only pop up when the user moves the cursor to the corresponding edge of the screen.

The recommended search queries may be presented to the user after a delay. The delay may be fixed (e.g., after five seconds), set by the user, or determined on a query-by-query basis. For example, other users who have submitted the search query may frequently interact with a search result within four seconds of the presentation of the search results. Based on this, the recommended search queries may be presented four seconds after the results have been presented.

A search query helper drawer may be presented to the user along with the search results for the query. The search query helper drawer is a GUI element that presents suggested search queries. The search query helper drawer may be positioned on the screen at a location. The location may be fixed (e.g., the bottom of the screen, at the top of the search results, after the 10th search result, etc.), set by the user, or determined dynamically, for example on a query-by-query basis. For example, other users who have submitted the search query may frequently interact with one of the first five results presented or else choose to stop searching or to submit a new search. Based on this, the search query helper drawer may be presented after the fifth result. The search query helper drawer may also be hidden unless the location is hovered over by the user. For example, the search query helper drawer may be available for access from the bottom or right-hand side of the screen, but only pop up when the user moves the cursor to the corresponding edge of the screen.

The search query helper drawer may be presented to the user after a delay. The delay may be fixed (e.g., after five seconds), set by the user, or determined dynamically, for example on a query-by-query basis. For example, other users who have submitted the search query may frequently interact with a search result within four seconds of the presentation of the search results. Based on this, the search query helper drawer may be presented four seconds after the results have been presented.

The recommended search queries may be presented to the user in response to operation of the search query helper drawer. The operation of the search query helper drawer may result in an animation depicting the opening of the drawer, a replacement of a graphic representing a closed drawer with a graphic representing an open drawer, or the removal of the UI element of the search query helper drawer and its replacement with the presentation of the recommended search query results. The recommended search queries may be positioned on a screen at a location. The location may be the same as the location of the search query helper drawer or at another location. The location may be fixed (e.g., the bottom of the screen, at the top of the search results, after the 10th search result, etc.), set by the user, or determined dynamically, for example on a query-by-query basis. For example, the recommended search queries may be presented in the center of the screen, as an overlay over the search results (e.g., an opaque or translucent layer), or within the visual depiction of an open drawer.

FIG. 1 is a network diagram depicting a client-server system 100, within which one example embodiment may be deployed. A networked system 102, in the example forms of a network-based marketplace or publication system, provides server-side functionality, via a network 104 (e.g., the Internet or Wide Area Network (WAN)) to one or more clients. FIG. 1 illustrates, for example, a web client 106 (e.g., a browser), and a programmatic client 108 executing on respective client machines 110 and 112.

An Application Program Interface (API) server 114 and a web server 116 are coupled to, and provide programmatic and web interfaces respectively to, one or more application servers 118. The application servers 118 host one or more marketplace applications 120, search applications 121, and payment applications 122. The application servers 118 are, in turn, shown to be coupled to one or more databases servers 124 that facilitate access to one or more databases 126.

The marketplace applications 120 may provide a number of marketplace functions and services to users that access the networked system 102. The search applications 121 may provide a number of search functions and services to users that access the networked system 102. The search applications 121 may allow users to submit queries and receive results responsive to the queries. The search applications 121 may be linked to or part of the marketplace applications 120. Accordingly, searches may be run by the search application 121 to find items for sale through the marketplace applications 120. The payment applications 122 may likewise provide a number of payment services and functions to users. The payment applications 122 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 120. While the marketplace, search, and payment applications 120, 121, and 122 are shown in FIG. 1 to each form part of the networked system 102, it will be appreciated that, in alternative embodiments, the search applications 121 may form part of a search service that is separate and distinct from the networked system 102. Likewise, the payment applications 122 may form part of a payment service that is separate and distinct from the networked system 102.

Further, while the system 100 shown in FIG. 1 employs a client-server architecture, the present invention is of course not limited to such an architecture, and could equally well find application in a distributed, or peer-to-peer, architecture system, for example. The various marketplace, search, and payment applications 120, 121, and 122 could also be implemented as standalone software programs, which do not necessarily have networking capabilities.

The web client 106 accesses the various marketplace, search, and payment applications 120, 121, and 122 via the web interface supported by the web server 116. Similarly, the programmatic client 108 accesses the various services and functions provided by the marketplace, search, and payment applications 120, 121, and 122 via the programmatic interface provided by the API server 114. The programmatic client 108 may, for example, be a seller application (e.g., the TurboLister application developed by eBay Inc., of San Jose, Calif.) to enable sellers to author and manage listings on the networked system 102 in an off-line manner, and to perform batch-mode communications between the programmatic client 108 and the networked system 102. As another example, the programmatic client 108 may be a search application to enable users to search for items. The items searched for may be informational items (e.g., news articles, blogs, images, multimedia content, etc.), transactional items (e.g., items for sale online, items for sale in brick-and-mortar locations, items wanted online, items wanted in brick-and-mortar locations), or other types of items.

The client machine 110 or 112 may present information to a user. For example, the client machine 110 may be running a web browser presenting a web page. The user may indicate a search query to the client machine 110. A search query defines the parameters of a search. A search query may include an alphanumeric string, an image, audiovisual data, or any suitable combination thereof. A search query may include filters that exclude results complying with or not complying with the filter. A search query may be composed of multiple elements. An element is a discrete portion of a search query, such as a word or phrase in an alphanumeric string, an image, or a filter. For example, the user may type a search query into a text field, select an item to search for similar or related items, upload an image to search for similar or related items, or any suitable combination thereof. One item is similar to another if they are substitutes for each other. For example, one television may be similar to another television. An item is related to another if they work together or are frequently purchased together. For example, peanut butter may be related to jelly, or a universal remote control may be related to a television.

The client machine 110 or 112 may submit the search query to an application server 118 running a search application 121. The search application 121 may divide the items being searched into categories. In some embodiments, each item is placed in one category. In other embodiments, each item may be placed in multiple categories. In some embodiments, the categories are organized into a hierarchy. For example, a particular pair of shoes may belong to a Shoes category, while the Shoes category itself belongs to a Clothing category.

The application server 118 may send the results of the search query back to the client machine 110 or 112. The application server 118 may also identify one or more related search queries. The related search queries may be modifications of the original search query or substitutions for the original search query. For example, if the original search query is "shoes," a modified query might constrain results to a Shoes category, or constrain results based on the location of the user, or add terms (e.g., search for "dress shoes," "black shoes," or the like). In this example, a substitute query might be "boots." The related search queries may be based on prior actions of other users after submitting the same search query, based on prior actions of this user after submitting other search queries, or based on promotional or advertising fees. For example, if this user has purchased Sony products in the past, a search for "stereo" may generate a recommended search for "Sony stereo." Similarly, if other users have constrained searches to a Home Electronics category after searching for "stereo," a constrained search for "stereo" in the category of Home Electronics may be a generated recommended search. As another example, if Yamaha has paid an advertising fee, a search for "Yamaha stereo" may be recommended. Similarly, if a seller has paid an advertising fee, a search for "stereo" within the seller's store or within items listed by the seller for sale may be recommended.

Additional recommendations may be based on top-selling products, trending products (e.g., products experiencing an increase in sales), popular global filters (e.g., price, item condition, etc.), related concepts, brand pages, daily deals, or any other item or class of items that the user may be interested in or that the search results provider may wish to have the user consider.

The application server 118 may identify a location on the screen at which the recommended search queries may be positioned. The location may be fixed (e.g., the bottom of the screen, at the top of the search results, after the 10th search result, etc.), set by the user, or determined on a query-by-query basis. For example, other users who have submitted the search query may frequently interact with one of the first five results presented or else choose to stop searching or to submit a new search. Based on this, the recommended search queries may be presented after the fifth result.

The application server 118 may identify a location on the screen at which a search query helper drawer operable to cause the display of the recommended search queries may be positioned. The location may be fixed (e.g., the bottom of the screen, at the top of the search results, after the 10th search result, etc.), set by the user, or determined on a query-by-query basis. For example, other users who have submitted the search query may frequently interact with one of the first five results presented or else choose to stop searching or to submit a new search. Based on this, the search query helper drawer may be presented after the fifth result.

The application server 118 may identify a delay after which the search query helper drawer may be presented to the user. The delay may be fixed (e.g., after five seconds), set by the user, or determined on a query-by-query basis. For example, other users who have submitted the search query may frequently interact with a search result within four seconds of the presentation of the search results. Based on this, the search query helper drawer may be presented four seconds after the results have been presented.

The application server 118 may identify a delay after which the recommended search queries may be presented to the user. The delay may be fixed (e.g., after five seconds), set by the user, or determined on a query-by-query basis. For example, other users who have submitted the search query may frequently interact with a search result within four seconds of the presentation of the search results. Based on this, the recommended search queries may be presented four seconds after the results have been presented. As another example, other users who have submitted the search query may frequently interact with a search result within four seconds of the presentation of a search query helper drawer. Based on this, the recommended search queries may be presented four seconds after the search query helper drawer has been presented.

The application server 118 may send the search results, the recommended search queries, the screen location, the search query helper drawer delay, and the recommended search query delay to the client machine 110 or 112. Alternatively, any subset set of these may be sent.

The client machine 110 or 112 may present the search results received from the application server 118 to the user. The client machine 110 or 112 may also present the search query helper drawer to the user. The search query helper drawer may be placed at a screen location provided by the application server 118, and may be displayed after a delay provided by the application server 118 elapses.

The client machine 110 or 112 may present the recommended search queries received from the application server 118 to the user. The client machine 110 or 112 may present the recommended search queries in response to a user activation of the search query helper drawer (e.g., a click on the drawer, a double-click on the drawer, a right-click on the drawer, a tap on a portion of a touchscreen depicting the drawer, hovering over the drawer for a period of time, or a keypress while the drawer is a default UI element). The client machine 110 or 112 may present the recommended search queries in response to a determination that a delay provided by the application server 118 has elapsed.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more promotional, marketplace, search, or payment functions that are supported by the relevant applications of the networked system 102.

Figure 2:
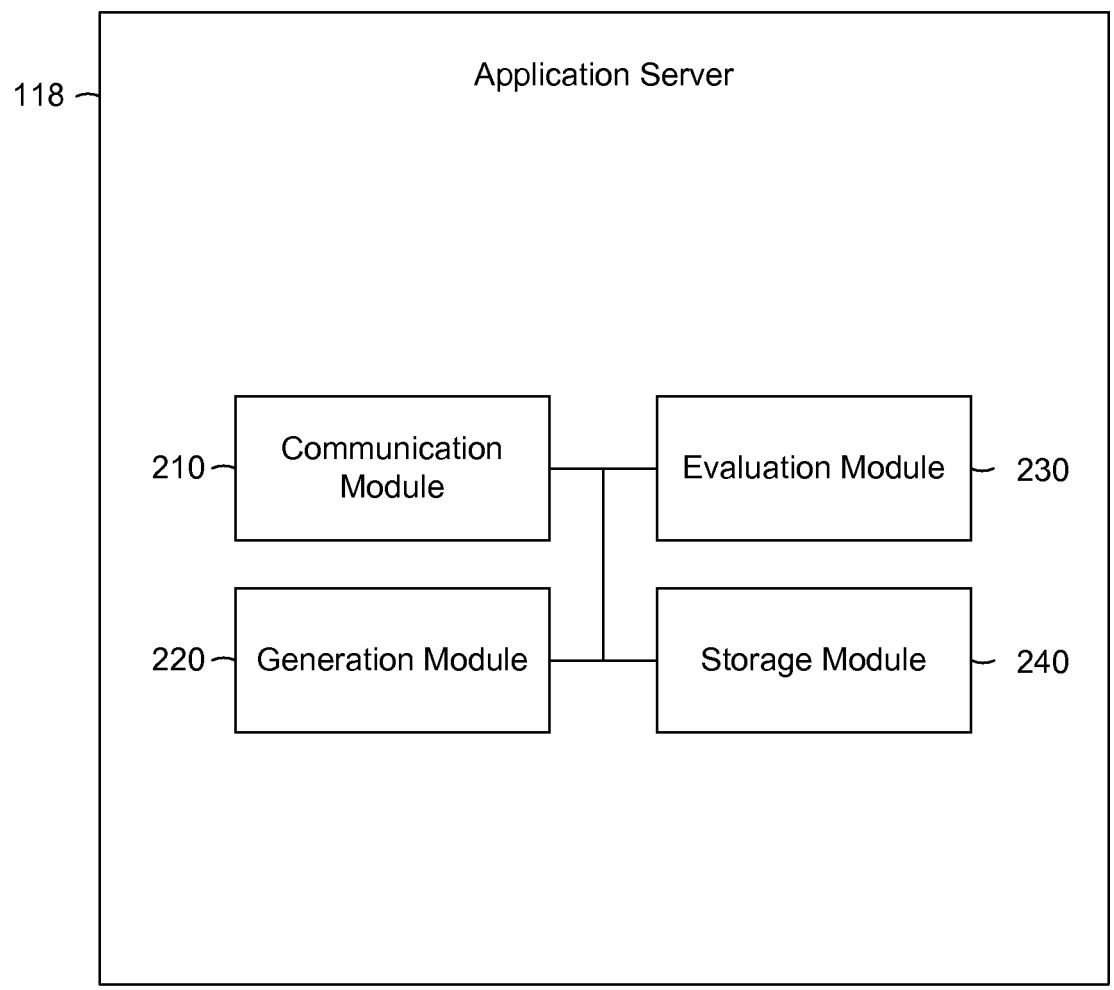
FIG. 2 is a block diagram illustrating components of an application server suitable for search guidance, according to some example embodiments.

FIG. 2 is a block diagram illustrating components of an application server 118 running a search application 121, according to some example embodiments. The application server 118 is shown as including a communication module 210, a generation module 220, an evaluation module 230, and a storage module 240, all configured to communicate with each other (e.g., via a bus, shared memory, a switch, or application programming interfaces (APIs)). Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The communication module 210 may control communication with the client machine 110 and the database 126. The communication module 210 may also send data for storage on the application server 118 or the database 126.

The communication module 210 may receive a search query from the client machine 110 or 112. Upon receiving a search query, the communication module 210 may send the search query to the generation module 220 to generate one or more recommended search queries. For example, the search query received may be a query for items matching a search string.

The generation module 220 may generate one or more recommended search queries based on the search query received (via the communication module 210) from the client machine 110 or 112. For example, if the received search query is for "shoes," the generation module 220 may use the storage module 240 to retrieve one or more search queries related to "shoes." The related queries may add additional keywords (e.g., "black shoes"), categories (e.g., "shoes" in the Clothing category), aspects (e.g., "shoes" offered for sale in auctions), or any suitable combination thereof. The related queries may also be substitute queries (e.g., "boots"). Optionally, a substitute query may include additional elements (e.g., "black boots", "boots" in the Clothing category, or "boots" offered for sale in auctions).

A search result may have both aspects and categories. As an example, consider a search result that is a listing for a particular pair of shoes. The shoes may belong to the category of Clothing, while the listing may have the aspect of being an auction. As another example, consider a search result that is a web page including an article about economic policy. The article may belong to the category of Economics, while the mode of presentation of the article—an aspect of the search result—is a web page.

The generation module 220 may generate a screen location for the presentation of a search query helper drawer based on the search query received from the client machine 110 or 112. For example, if the received search query is for "shoes," and other users that have searched for "shoes" in the past frequently interact with one of the first ten results, the location for the search query helper drawer to be presented may be after the tenth result. The location may be in the form of a result number (e.g., to be presented as the eleventh result), a pixel location (e.g., 600 pixels from the top of the screen), or in another format. The location may also be set independently of the search query received. For example, it may be based on a global average of results across all user interactions, or set as a constant. The threshold for user interactions may also be adjusted. For example, the search query helper drawer may be presented after the result that includes a certain percentage of user interactions. To illustrate, if 20% of users interact with the first result, 10% interact with the second result, 5% interact with each of the third-tenth results, and the remaining 30% interact with a result farther down the list, then to capture 50% of user interactions, the search query helper drawer would be placed after the sixth result (20%+10%+5%+5%+5%+5%=50%). To capture 70% of user interactions in this example, the search query helper drawer would be placed after the tenth result.

The generation module 220 may generate a screen location for the presentation of the recommendations based on the search query received from the client machine 110 or 112. For example, if the received search query is for "shoes," and other users that have searched for "shoes" in the past frequently interact with one of the first ten results, the location for the recommendations to be presented may be after the tenth result. The location may be in the form of a result number (e.g., to be presented as the eleventh result), a pixel location (e.g., 600 pixels from the top of the screen), or in another format. The location may also be set independently of the search query received. For example, the location may be determined using the algorithm described above for placement of the search query helper drawer. Alternatively, the search recommendations may be placed at the bottom of the screen, side of the screen, center of the screen, or other predetermined location.

The evaluation module 230 may receive the search query from the communication module 210 and process the search query. The evaluation module 230 may access a database (e.g., database 126) to identify search results responsive to the search query. The communication module 210 may send the results provided by the evaluation module 230 to the client machine 110 or 112, for display to the user.

The storage module 240 may store data being searched by the search query and store data regarding prior searches by the querying user and other users. For example, historical query data, user modeling data, context modeling data, and query modeling data may all be stored by the storage module 240. Additionally or alternatively, the storage module 240 may access data storage on other devices, such as an external database.

Figure 3:
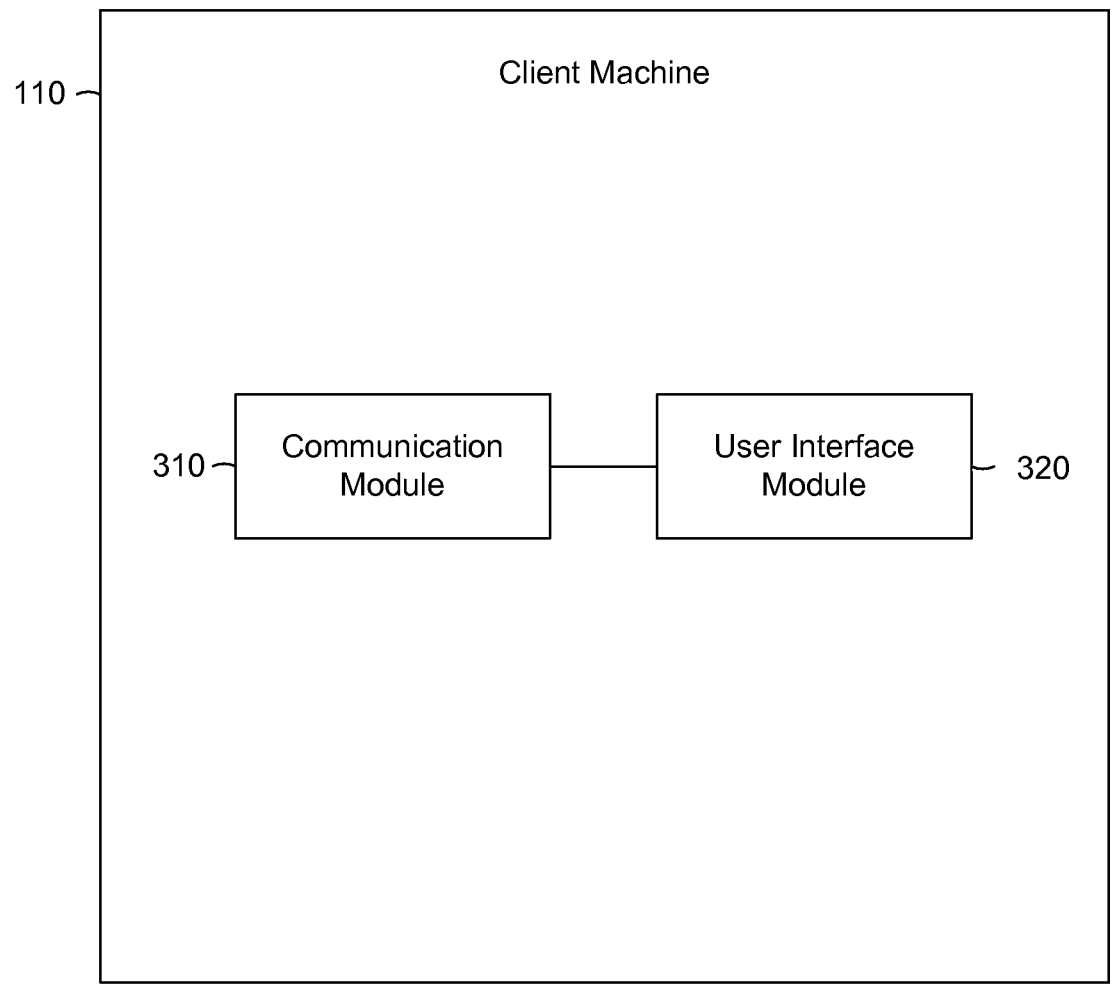
FIG. 3 is a block diagram illustrating components of a client machine suitable for search guidance, according to some example embodiments.

FIG. 3 is a block diagram illustrating components of a client machine suitable for search guidance, according to some example embodiments. The client machine 110 or 112 is shown as including a communication module 310 and a user interface module 320, configured to communicate with each other (e.g., via a bus, shared memory, or a switch).

The communication module 310 may communicate with the application server 118, the network 104, or any suitable combination thereof. Information received via the communication module 310 may be presented (e.g., displayed on a display device) via the user interface module 320. Information may be selected or search queries may be entered by a user using a user interface presented by the user interface module 320. The search queries may be communicated to the application server 118 via the communication module 310. The communication module 310 may receive a response from the application server 118 that includes a set of results, a set of recommendations, a recommendation location, a recommendation delay, a search query helper drawer location, or a search query helper drawer delay, in any combination. Search results generated by the application server 118 may be received by the communication module 310 and presented to the user by the user interface module 320. For example, the search results may be presented in a list view or a gallery view.

The user interface module 320 may present a search query helper drawer operable to display recommended search queries received from the application server 118. The search query helper drawer may be presented at a location indicated by the application server 118, and may be presented after a delay. For example, the search query helper drawer may be presented at the fifth location in the search result list after a five-second delay.

The location of the search query helper drawer may be adjusted after the user interacts with it. For example, the search query helper drawer may initially be presented at the fifth location, but moved to the first location after the drawer has been opened and the user has interacted with one of the recommended search queries. After the user has interacted with the search query helper drawer, the drawer may change visually to indicate its open status. For example, the open search query helper drawer may be highlighted while other UI elements are dimmed. The opened search query helper drawer may be operable to close the drawer or return to the original query. A separate button operable to close the drawer or return to the original query may also be presented.

The user interface module 320 may present recommended search queries received from the application server 118. The recommended search queries may be presented at a location indicated by the application server 118, and may be presented after a delay. For example, the recommended search queries may be presented at the fifth location in the search result list after a five-second delay.

The location of the recommended search queries may be adjusted after the user interacts with them. For example, the recommended search queries may initially be presented at the fifth location, but moved to the first location after the user interacts with one of the recommended search queries. As another example, the recommended search queries may initially be presented at the location of the search query helper drawer, but moved to the first location within the search results after the user interacts with one of the recommended search queries. After the user has interacted with one of the recommended search queries, the activated search query may change visually to indicate its active status. For example, the activated search query may be highlighted while the other recommended search queries are dimmed. The activated query may be operable to return to the original query. A separate button operable to return to the original query may also be presented.

In some example embodiments, the application server 118 provides a larger number of recommended search queries than the user interface module 320 is configured to display. For example, the application server 118 may generate three category recommendations (i.e., recommendations based on the original query and one or more categories), two aspect recommendations (i.e., recommendations based on the original query and one or more aspects), and a related query recommendation (i.e., a recommendation of a query related to the original query), while the user interface module 320 may be configured to display no more than four recommendations. In these embodiments, the user interface module 320 may select the desired number of recommendations from the recommendations provided by the application server 118. In one example embodiment, the four recommendations with the highest success rate are chosen. In another example embodiment, the four recommendations with the greatest number of uses are chosen. In a third example embodiment, recommendations are chosen to maximize the variety of recommendation types. In a yet another example embodiment, the recommendations are chosen randomly. These embodiments may be combined. For example, an embodiment that maximizes the variety of recommendation types may choose the recommendations to present, within each recommendation type, based on the success rate, the number of uses, or using randomization.

The success rate of a recommendation is the percentage of uses of the recommendation that result in a successful session. A successful session may be a session in which a user interacts with an item in any way (e.g., views the item, bids on the item, buys the item, subscribes to the item, etc.) or a session in which a particular interaction is performed (e.g., bids on the item, buys the item, or both). An unsuccessful session may be any session that is not successful. Other criteria may also be used to identify successful and unsuccessful sessions.

Figure 4:
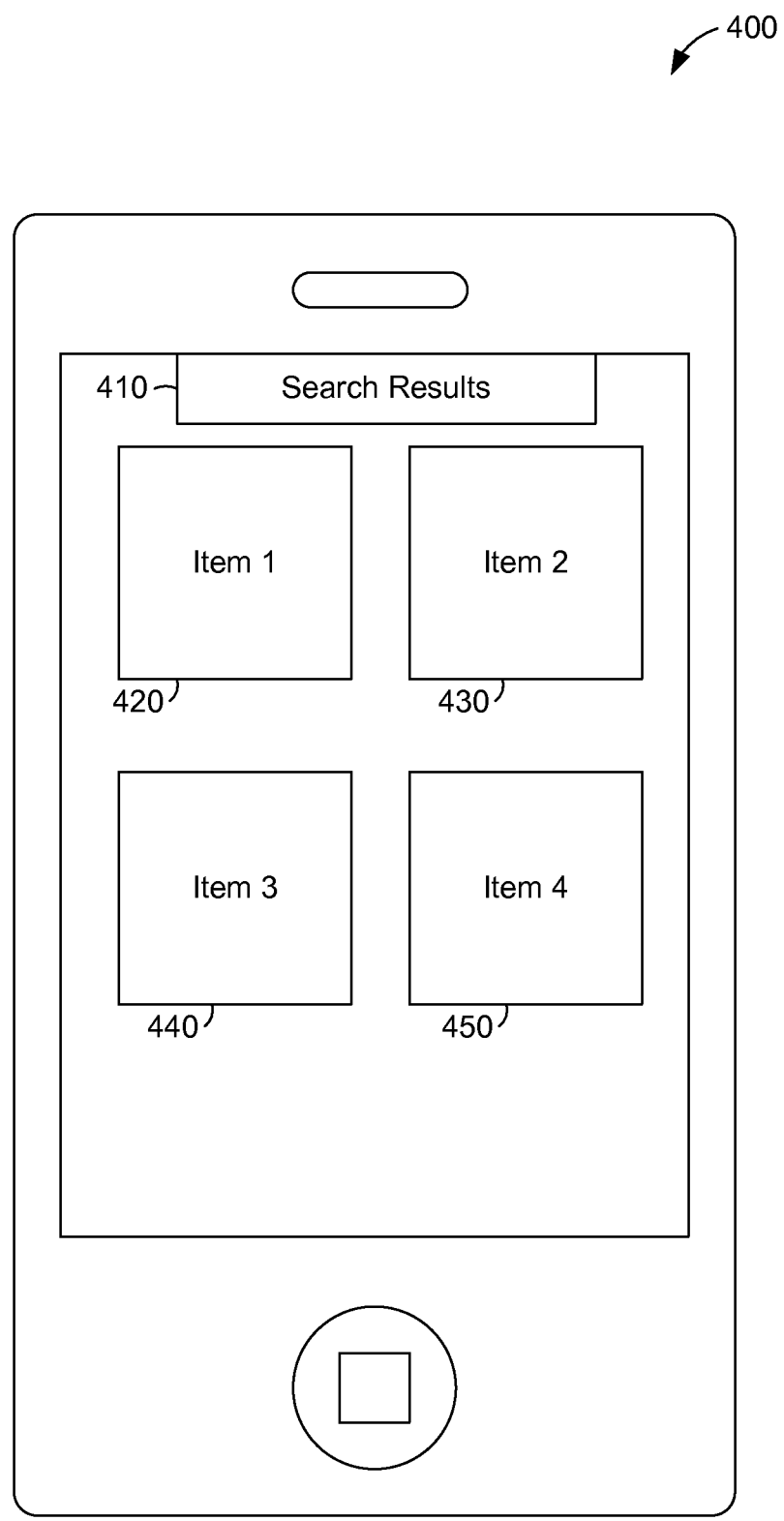
FIG. 4 is a block diagram illustrating a user interface suitable for search guidance, according to some example embodiments.

FIG. 4 is a block diagram 400 illustrating a user interface suitable for presenting search results, according to some example embodiments. As can be seen in block diagram 400, the user interface includes a title 410, "Search Results" and includes four search results 420-450 in the upper portion of the screen. Each search result 420-450 may be operable to view additional information about the search result. For example, a search result may be an item for sale and the initial search result screen may show an image of the item and a label. Clicking on or otherwise activating the image of the item may result in a new page being displayed that shows additional information about the item, such as an item description, additional images, a price, and so on.

The results may include items, events, locations, people, and so on. Items may be items for sale or items that are wanted for purchase. Events may be concerts, festivals, movies, sporting events, and the like. Locations may be monuments, stores, gas stations, restaurants, stadiums, and the like. People may be friends of the user, celebrities, or other people. In some example embodiments, one or more of the items, events, locations, or people displayed is chosen based on an advertising fee paid.

Figure 5:
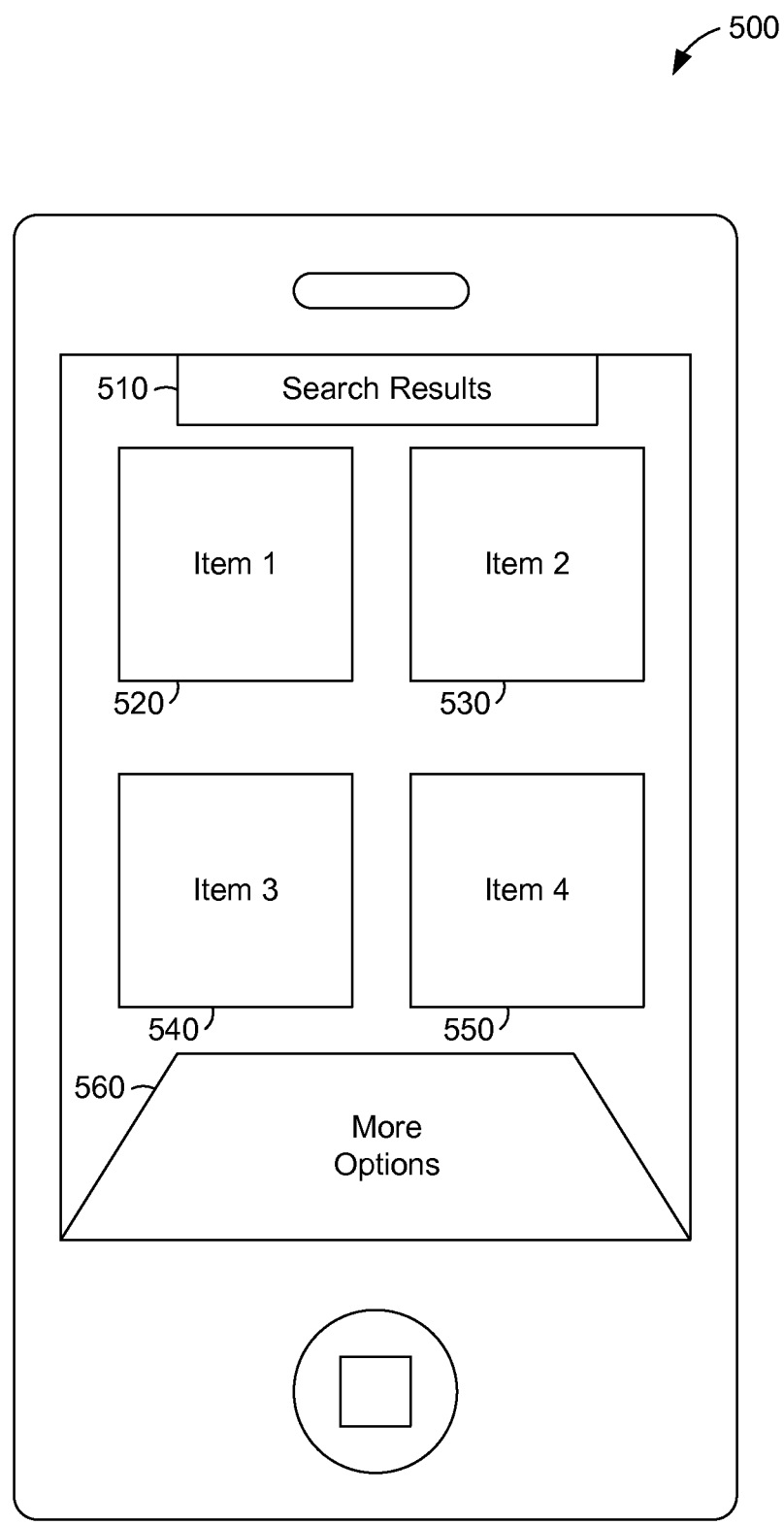
FIG. 5 is a block diagram illustrating a user interface suitable for search guidance, according to some example embodiments.

FIG. 5 is a screen diagram 500 illustrating a user interface suitable for presenting a search query helper drawer, according to some example embodiments. As can be seen in screen diagram 500, the user interface includes a title 510, "Search Results," a closed search query helper drawer 560 at the bottom of the screen, and four search results 520-550 in the upper portion of the screen. The search query helper drawer 560 may be a button that is operable to view the recommended search queries. The screen of FIG. 5 may be presented to a user viewing the screen of FIG. 4 after a predetermined period of time elapses without the user selecting a search result (e.g., 5 seconds), after the user scrolls past a predetermined number of search results (e.g., 10 search results), or after receiving an input from the user (e.g., a particular keypress or activation of a GUI element).

Figure 6:
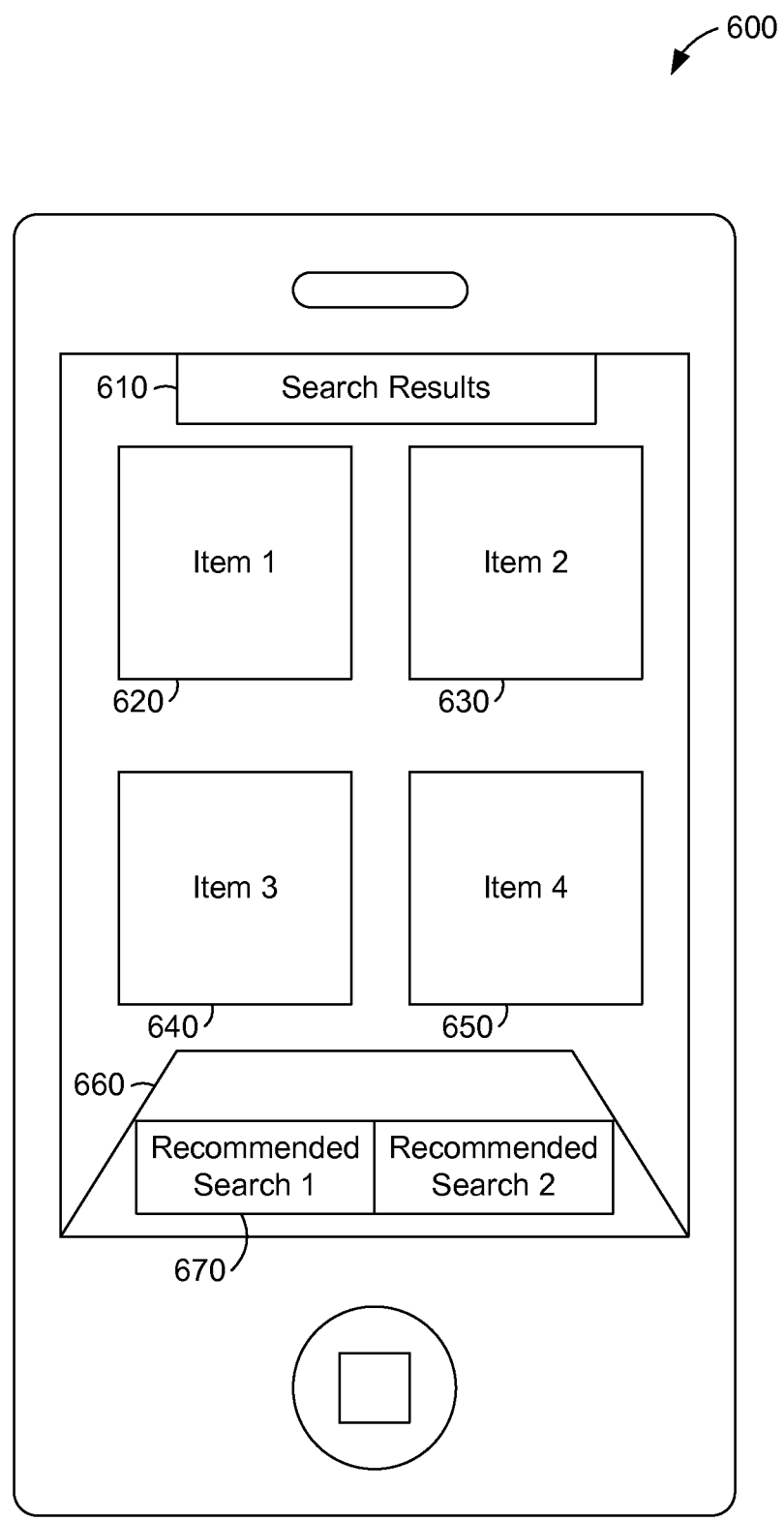
FIG. 6 is a block diagram illustrating a user interface suitable for search guidance, according to some example embodiments.

FIG. 6 is a screen diagram 600 illustrating a user interface suitable for presenting a search query helper drawer, according to some example embodiments. As can be seen in screen diagram 600, the user interface includes title 610, "Search Results," an open search query helper drawer 660 at the bottom of the screen, two search recommendations 670 within the search query helper drawer 660, and four search results 620-650 in the upper portion of the screen. The search recommendations 670 may be buttons that are operable to submit the recommended search queries.

Figure 7:
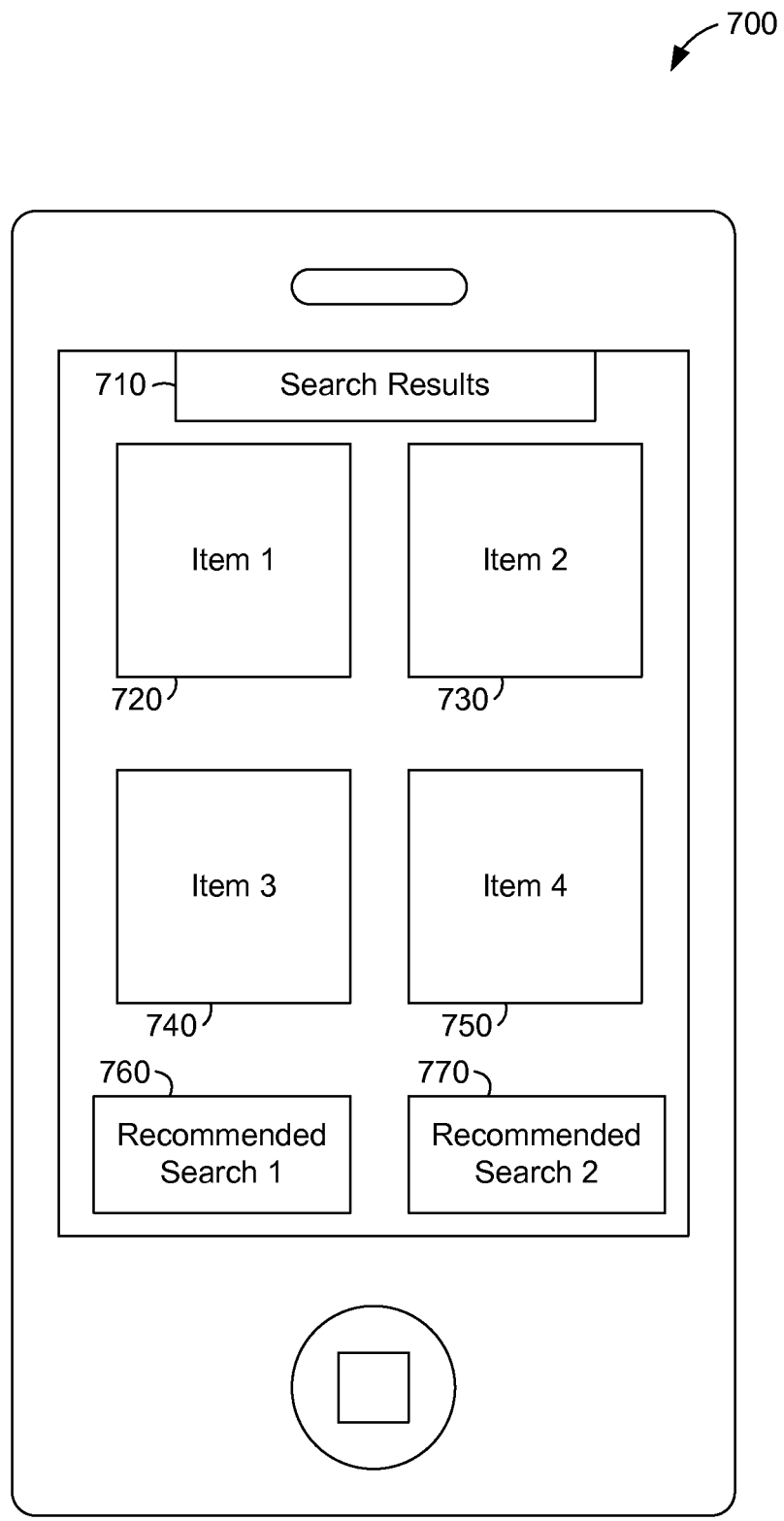
FIG. 7 is a block diagram illustrating a user interface suitable for search guidance, according to some example embodiments.

FIG. 7 is a block diagram illustrating a user interface 700 suitable for search guidance, according to some example embodiments. As can be seen in the block diagram of FIG. 7, the user interface 700 includes title 710, search results 720-750, and search recommendations 760 and 770.

Each search result 720-750 may be operable to view additional information about the search result. For example, a search result may be an item for sale and the initial search result screen may show an image of the item and a label. Clicking on the image of the item may result in a new page being displayed that shows additional information about the item, such as an item description, additional images, a price, and so on. The results 720-750 may include items, events, locations, people, and so on. Items may be items for sale or items that are wanted for purchase. Events may be concerts, festivals, movies, sporting events, and the like. Locations may be monuments, stores, gas stations, restaurants, stadiums, and the like. People may be friends of the user, celebrities, or other people. In some example embodiments, one or more of the items, events, locations, or people displayed is chosen based on an advertising fee paid.

The search recommendations 760 and 770 may be buttons that are operable to submit the recommended search queries. After a search recommendation 760 or 770 is selected, the corresponding search query may be executed and an updated user interface 700 presented. The updated user interface 700 may include new search results 720-750 and/or new search recommendations 760 and 770.

Figure 8:
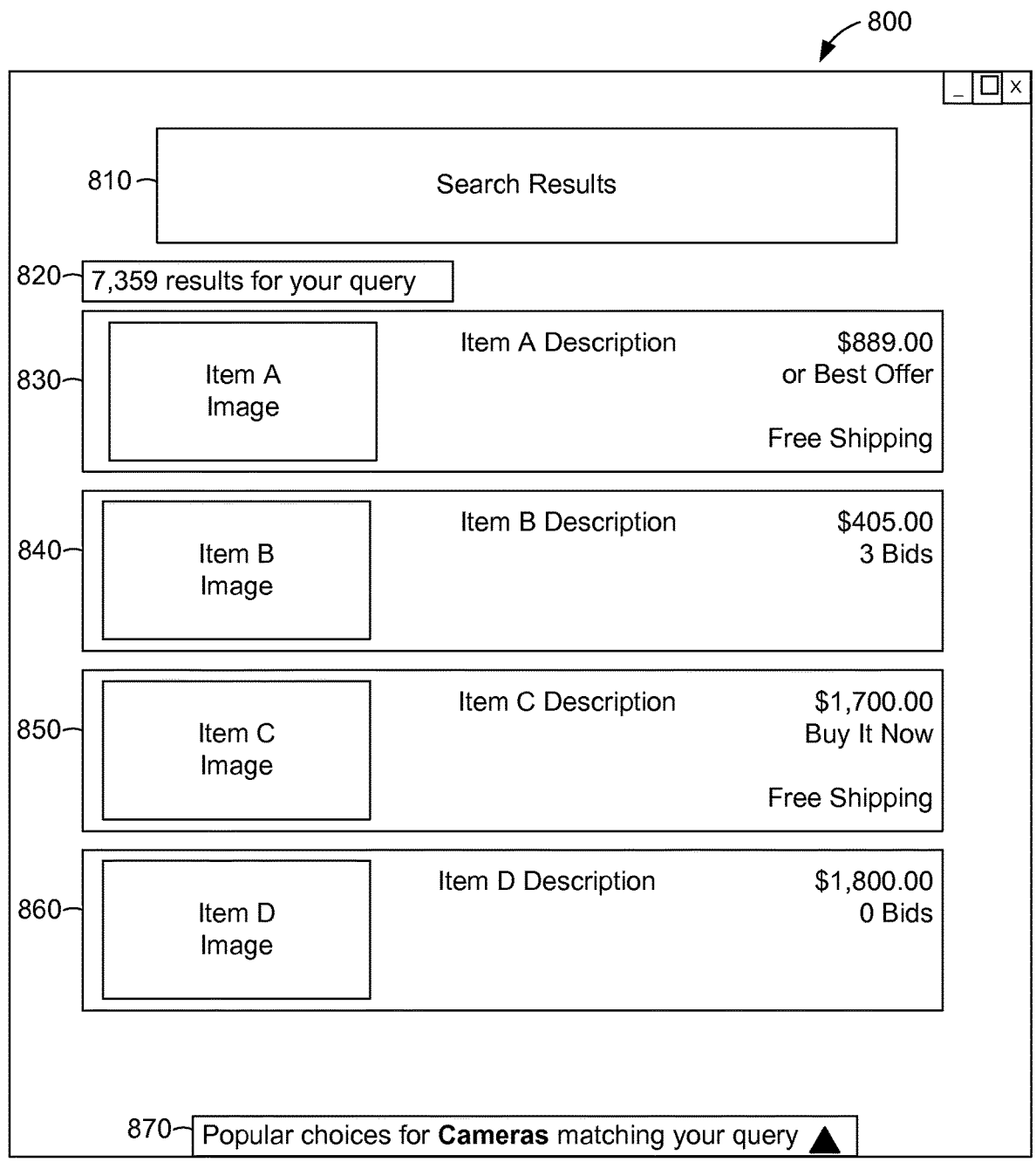
FIG. 8 is a block diagram illustrating a user interface suitable for search guidance, according to some example embodiments.

FIG. 8 is a screen diagram 800 illustrating a user interface suitable for presenting a search query helper drawer, according to some example embodiments. As can be seen in screen diagram 800, the user interface includes title 810, "Search Results." The screen diagram 800 shows a count of search results 820 for the submitted query, as well as a subset of those search results 830-860. As shown in FIG. 8, search results 830-860 are listings of items for sale, and may also be referred to as listings 830-860. The UI may additionally include an element operable to enter a new query, show the submitted query, or both. Search results 830-860 are for items A, B, C, and D, respectively, each of which is available for purchase. The search results 830-860 may include an image for each item, a description for each item, a price for each item, and other information for each listing. For example, the listing 830 for item A shows that the price includes free shipping and that the seller is open to a "Best Offer." Likewise, the listing 840 for item B shows that the item is being sold by auction and currently has three bids. The listing 850 for item C shows that the item is being sold at a fixed price, or "Buy It Now," and that the price includes free shipping. The listing 860 for item D shows the current price of the item, and that there are no bids (which also indicates that the item is being sold by auction). At the bottom of the screen is a closed search query helper drawer 870. The user may be able to scroll through the search results. The search query helper drawer 870 may maintain its position at the bottom of the screen as the user scrolls.

The search query helper drawer 870 indicates that suggested search queries within the drawer will show results limited to the "Cameras" category. The indicated category may be emphasized in bold, with highlighting, presented in a different color from other text in the drawer 870, or emphasized in another way. The drawer 870 includes an up arrow indicator, which may provide a visual indication that the drawer 870 may be operated to expand upward. The drawer 870 may be sensitive to a hovering mouse cursor. For example, if the mouse cursor hovers over the closed drawer 870, the text of the drawer 870 may change color, the arrow indicator may change color, or both. If the user hovers over the drawer 870 for a predetermined period of time (e.g., five seconds), clicks on the drawer 870, delays a predetermined period of time without interacting with the drawer 870 or search results (e.g., ten seconds), or scrolls past a predetermined number of results (e.g., twenty results), the drawer 870 may open as shown, for example, in FIG. 8. The opening of the drawer 870 may be performed via a smooth animation. The animation may begin slowly and accelerate as the drawer 870 opens.

Figure 9:
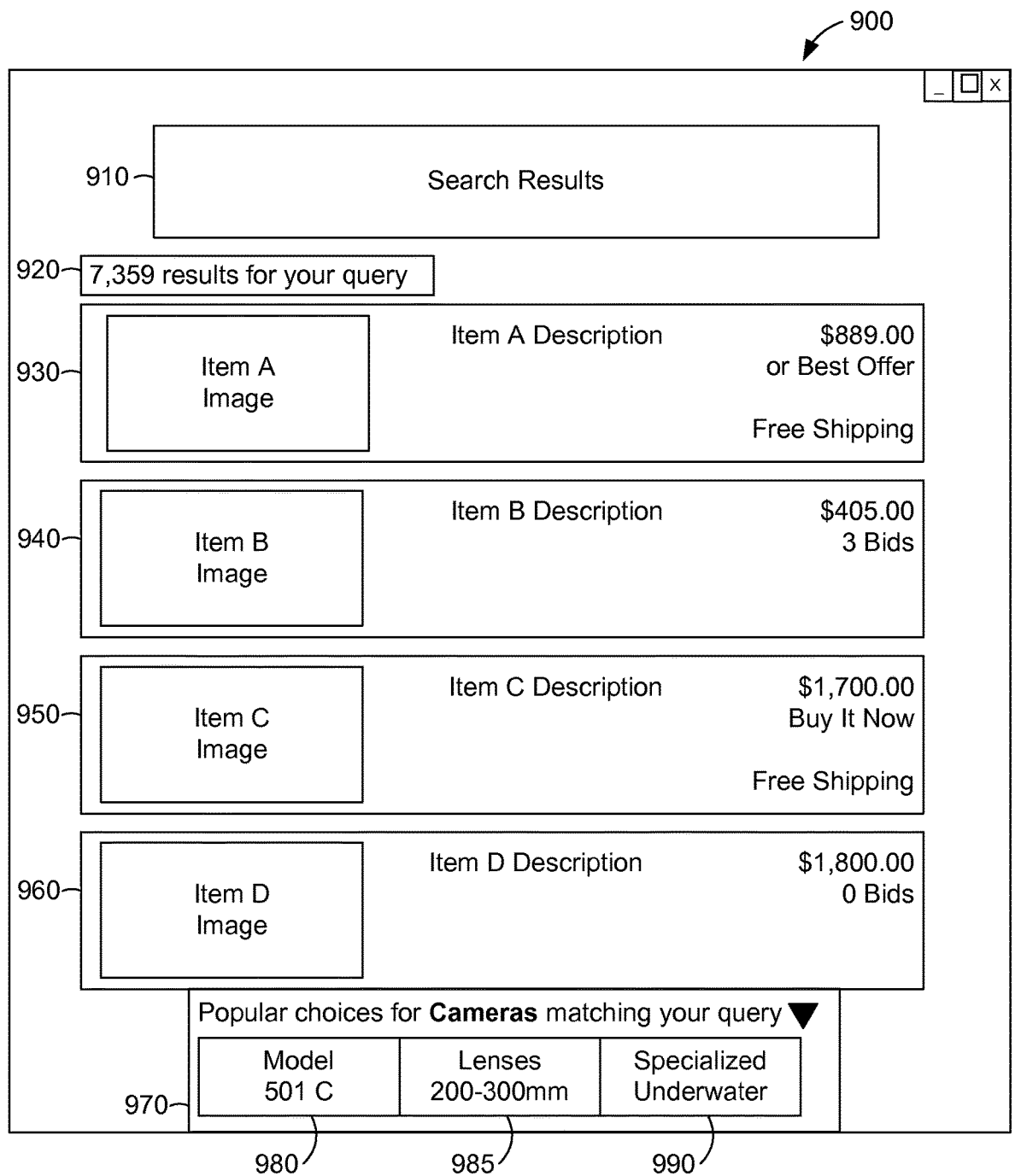
FIG. 9 is a block diagram illustrating a user interface suitable for search guidance, according to some example embodiments.

FIG. 9 is a screen diagram 900 illustrating a user interface suitable for presenting a search query helper drawer, according to some example embodiments. The UI of FIG. 9 may be the UI of FIG. 8 after the search query helper drawer has been opened. As can be seen in screen diagram 900, the user interface includes title 910, "Search Results." The screen diagram 900 shows a count of search results 920 for the submitted query, as well as a subset of those search results 930-960. The UI may additionally include an element operable to enter a new query, show the submitted query, or both. FIG. 9 shows search results 930-960 for items available for purchase A, B, C, and D, as described above with respect to FIG. 8. At the bottom of the screen is an open search query helper drawer 970. The search query helper drawer 970 indicates that suggested search queries within the drawer 970 will show results limited to the "Cameras" category. The drawer 970 includes a down arrow indicator, which may provide a visual indication that the drawer 970 may be operated to shrink downward and hide its contents. Also shown within the drawer 970 are three UI elements 980-990 operable to constrain the search within the category of Cameras. For example, element 980, labeled "Model 501C," may be operable to constrain the search query to items having a model attribute with a value of "501C" within the category of Cameras. Similarly, the element 985, labeled "Lenses 200-300 mm," may be operable to constrain the search query to items having a lens attribute in the range of 200-300 mm, within the category of Cameras. The element 990, labeled "Specialized Underwater," may be operable to constrain the search query to items having a specialized attribute of underwater, within the category of cameras.

Figure 10:
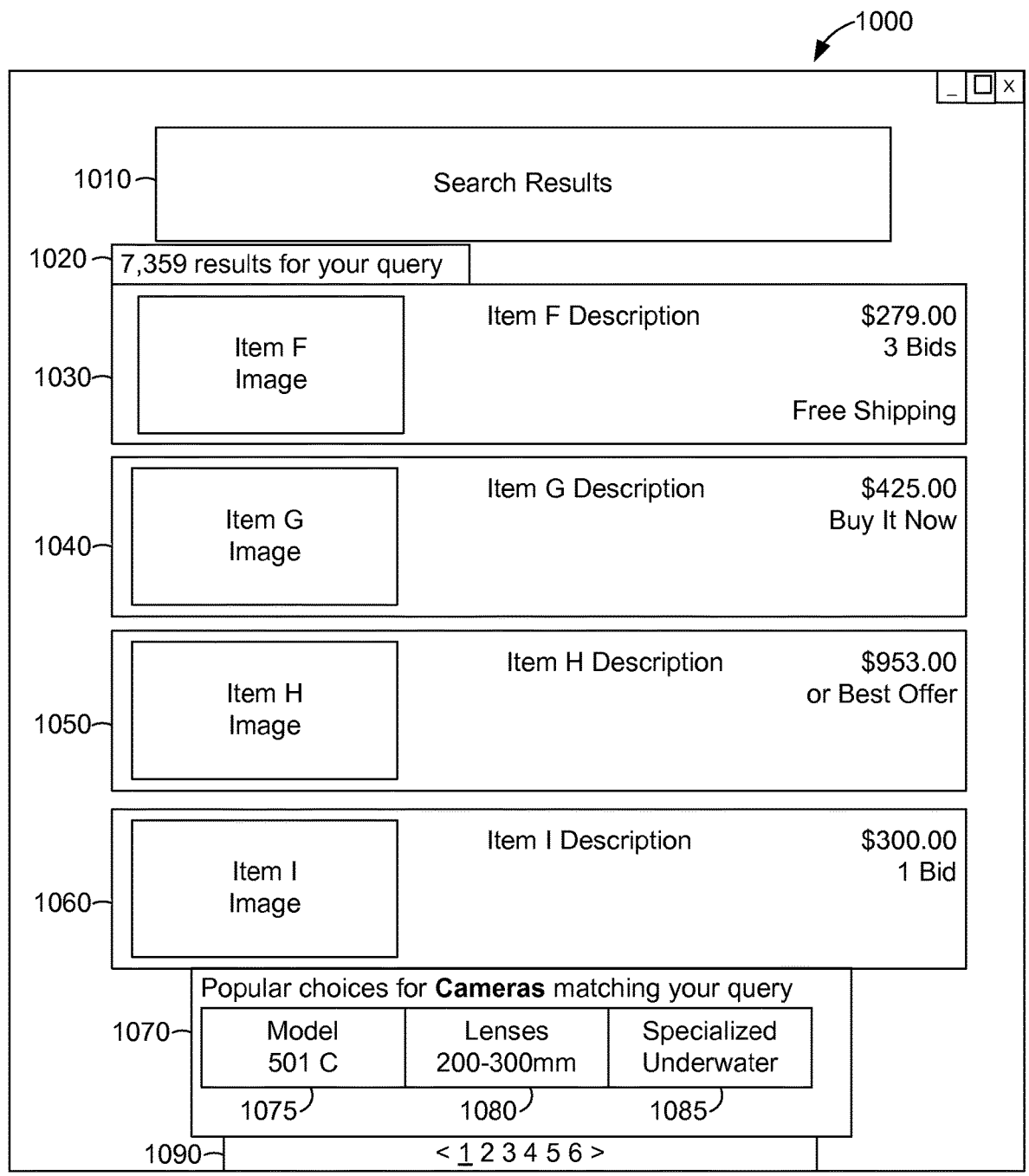
FIG. 10 is a block diagram illustrating a user interface suitable for search guidance, according to some example embodiments.

FIG. 10 is a screen diagram 1000 illustrating a user interface suitable for presenting a search query helper drawer, according to some example embodiments. The UI of FIG. 10 may be the UI of FIG. 8 after the user has scrolled to the bottom of the initial set of search results. As can be seen in screen diagram 1000, the user interface includes title 1010, "Search Results." The screen diagram 1000 shows a count of search results 1020 for the submitted query, as well as a subset of those search results 1030-1060. The UI may additionally include an element operable to enter a new query, show the submitted query, or both.

Search results 1030-1060 are listings for items available for purchase F, G, H, and I, respectively. The listing 1030-1060 for each item includes an image and a description. Additional information may also be shown. For example, listing 1030 shows item F with a current price of $279, three bids in an auction format, and free shipping. Listing 1040 shows item G with a current price of $425 in a buy-it-now format. Listing 1050 shows Item H with a current price of $953 in a fixed price or best offer format. Listing 1060 shows Item I with a current price of $300 in an auction format with one bid. At the bottom of the screen are three UI elements 1075-1085 in search query drawer 1070. The UI elements 1075-1085 are operable to constrain the search within the category of Cameras. For example, the UI element 1075, labeled "Model 501C," may be operable to constrain the search query to items having a model attribute with a value of "501C" within the category of Cameras. Similarly, the element 1080, labeled "Lenses 200-300 mm," may be operable to constrain the search query to items having a lens attribute in the range of 200-300 mm, within the category of Cameras. The element 1085, labeled "Specialized Underwater," may be operable to constrain the search query to items having a specialized attribute of underwater, within the category of cameras. The suggested search queries may be contained within the search query drawer 1070 or directly included below the results. The search query drawer 1070 may be maintained in an open position, or include an element operable to close the drawer 1070. Below the UI elements 1075-1085 is shown a UI element 1090 operable to display more results in the current query. For example, the current result set may be a first set of results, which may be indicated by highlighting, underlining, or otherwise differentiating the page numbered "1." The left and right arrow icons may be operable to increment or decrement the current page or set of results. The page numbers 1-6 may be operable to bring up the corresponding set of results.

Figure 11:
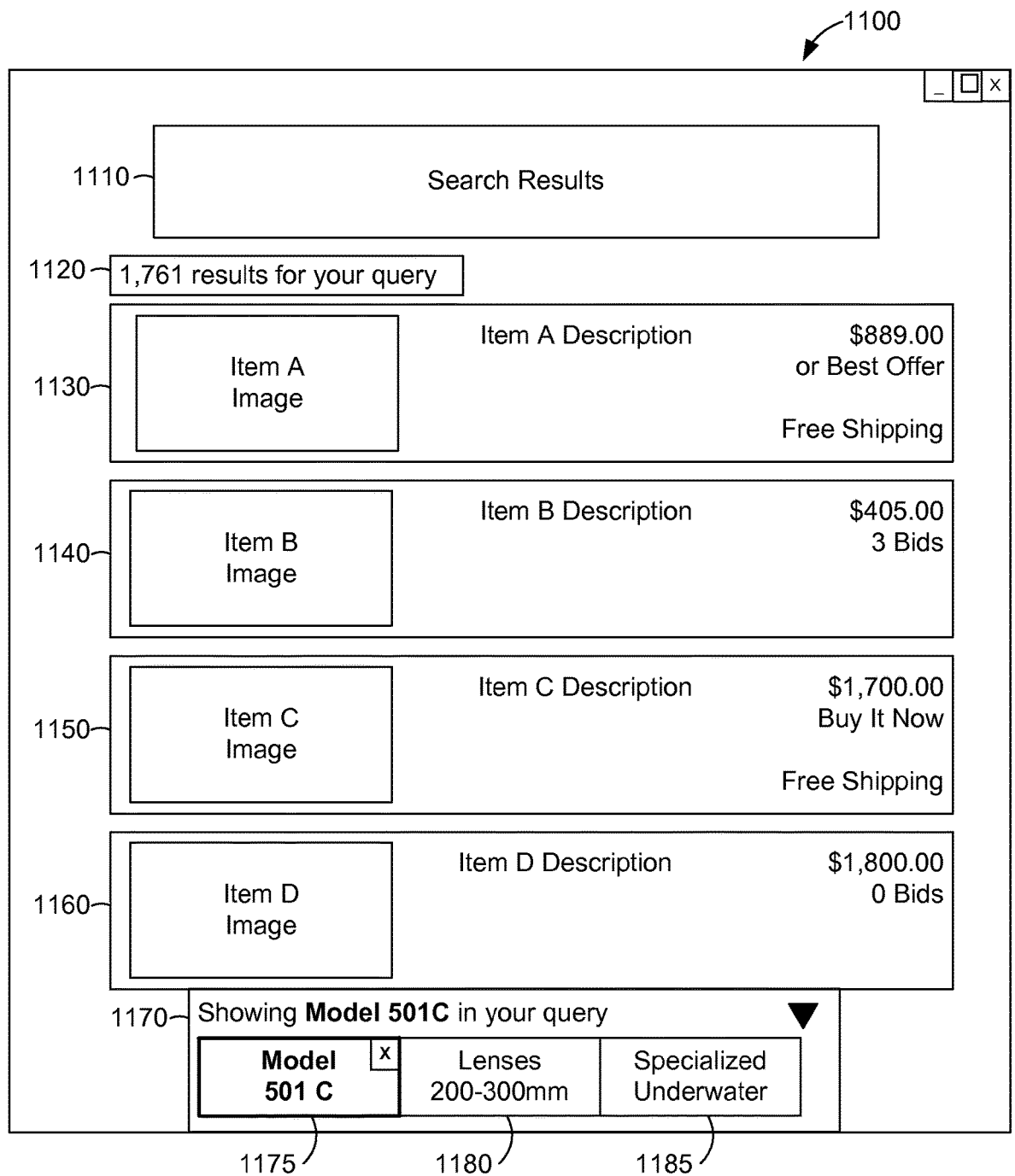
FIG. 11 is a block diagram illustrating a user interface suitable for search guidance, according to some example embodiments.

FIG. 11 is a screen diagram 1100 illustrating a user interface suitable for presenting a search query helper drawer, according to some example embodiments. The UI of FIG. 11 may be the UI of FIG. 8 after a recommended search query from the search query helper drawer has been selected. As can be seen in the screen diagram 1100, the user interface includes title 1110, "Search Results." The screen diagram 1100 shows a count of search results 1120 for the submitted query, as well as a subset of those search results 1130-1160. The UI may additionally include an element operable to enter a new query, show the submitted query, or both. FIG. 11 shows search results 1130-1160 for items available for purchase A, B, C, and D, respectively, as described above with respect to FIG. 8. At the bottom of the screen is an open search query helper drawer 1170, as described above with respect to FIG. 8. The search query helper drawer 1170 indicates that the currently displayed results are limited to items having a model of "501C." The drawer 1170 includes a down arrow indicator, which may provide a visual indication that the drawer 1170 may be operated to shrink downward and hide its contents. Also shown within the drawer 1170 are three UI elements 1175-1185 operable to constrain the search within the category of Cameras. For example, the element 1175, labeled "Model 501C," may be operable to constrain the search query to items having a model attribute with a value of "501C" within the category of Cameras. Similarly, the element 1180, labeled "Lenses 200-300 mm," may be operable to constrain the search query to items having a lens attribute in the range of 200-300 mm, within the category of Cameras. The element 1185, labeled "Specialized Underwater," may be operable to constrain the search query to items having a specialized attribute of underwater, within the category of cameras. As shown in FIG. 11, the element 1175 corresponds to the currently active recommended search. Accordingly, the element 1175 may be presented in bold or otherwise highlighted to indicate that it is currently active. The currently active element may also include an icon operable to de-select the element. For example, an "x" may be shown in a square, circle, octagon, or other shape. The inactive elements 1180-1185 may be operable to add their corresponding queries to the current query or to replace the current query with the corresponding query. For example, operation of the element 1180, labeled "Lenses 200-300 mm," may cause the display of search results matching the original query with a model of 501C and a lens in the range of 200-300 mm. Alternatively, operation of the element 1180, labeled "Lenses 200-300 mm," may cause the display of search results matching the original query with a lens in the range of 200-300 mm without regard to model.

Figure 12:
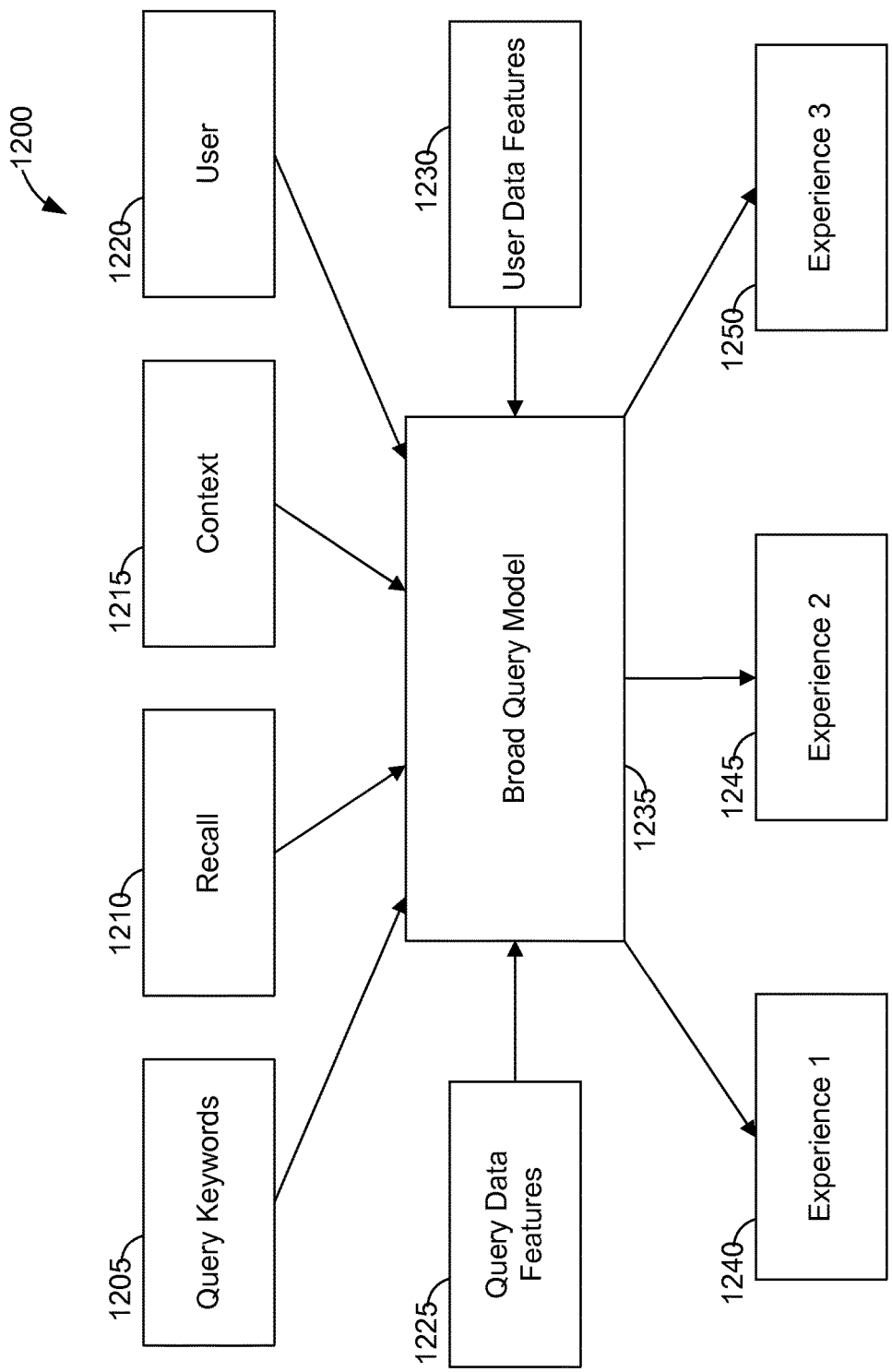
FIG. 12 is a block diagram illustrating factors suitable for search guidance, according to some example embodiments.

FIG. 12 is a block diagram 1200 illustrating factors suitable for search guidance, according to some example embodiments. As shown in the block diagram 1200, the query keywords 1205, recall 1210, context 1215, user 1220, query data features 1225, and user data features 1230 may be inputs into the broad query model 1235. The broad query model 1235 may generate one or more experiences 1240-1250.

The query keywords 1205 may be part of a search query submitted by the user. For example, a search query may be composed of a selected image and a plurality of keywords.

The recall 1210 may include the result set generated for the user in response to the search query. Continuing with the example of a search query composed of an image and a plurality of keywords, the result set may include images similar to the selected image, articles containing one or more of the plurality of keywords, articles including the selected image, articles including images similar to the selected image, images with titles or metadata including one or more of the plurality of keywords, or results that are found to be relevant to the search in another way.

The context 1215 may encompass any information about the circumstances under which the query is submitted. For example, the context may include not only the search query and the user, but the browser being used, the time of day the query is submitted, which queries were submitted before the current query, and any other information about the circumstances under which the query is submitted.

The user 1220 can include information about the user submitting the query. For example, the user's name, age, address, gender, income level, education level, marital status, and any other information known about the user.

In some example embodiments, the query keywords 1205, recall 1210, context 1215, and user 1220 are accessed by the broad query model 1235 before information regarding the query data features 1225 and the user data features 1230 is accessed. In other example embodiments, input data elements are accessed by the broad query model 1235 in a different order.

The query data features 1225 include information based on the query. For example, a search commonly run by other users (or all users including the current user) after running the current search query would be a query data feature 1225. To illustrate, a search for "digital camera" may frequently follow searches for "camera." Accordingly, a search for "digital camera" may be a query data feature for the "camera" query.

The user data features 1230 include information based on the user. For example, a modification commonly run by the current user to other queries may be a user data feature 1230. To illustrate, the current user may frequently follow searches for items with the same search query limited to items available for immediate purchase (e.g., "Buy-It-Now" items). Accordingly, modifying a search to include the Buy-It-Now aspect may be a user data feature 1230 for the user.

After considering the query data features 1225 and the user data features 1230 for the input query (including the query keywords 1205), recall 1210, context 1215, and user 1220, the broad query model 1235 may generate one or more experiences 1240-1250. Each experience 1240-1250 may be a recommended query. For example, the broad query model 1235 may apply various weights to queries generated using the inputs 1205-1230 to generate the experiences 1240-1250. Based on the query data features 1225, a search for "digital camera" may be generated. Based on the user data features 1230, a search for "camera" in listings having the "Buy-It-Now" aspect may be generated. Based on weighting factors or recommendation hierarchy, the recommendation based on the user data features 1230 may be presented in the first position as the experience 1240. Based on the weighting factors or recommendation hierarchy, the recommendation based on the query data features 1225 may be presented in the second position as the experience 1245. A combined recommendation of a search for "digital camera" in listings having the "Buy-It-Now" aspect may also be generated. The combined recommendation may, based on the weighting factors or recommendation hierarchy, be presented in the third position as the experience 1250. In other embodiments, different combinations of recommendations, weighting factors, hierarchies, and numbers and positions of results may be used.

Figure 13:
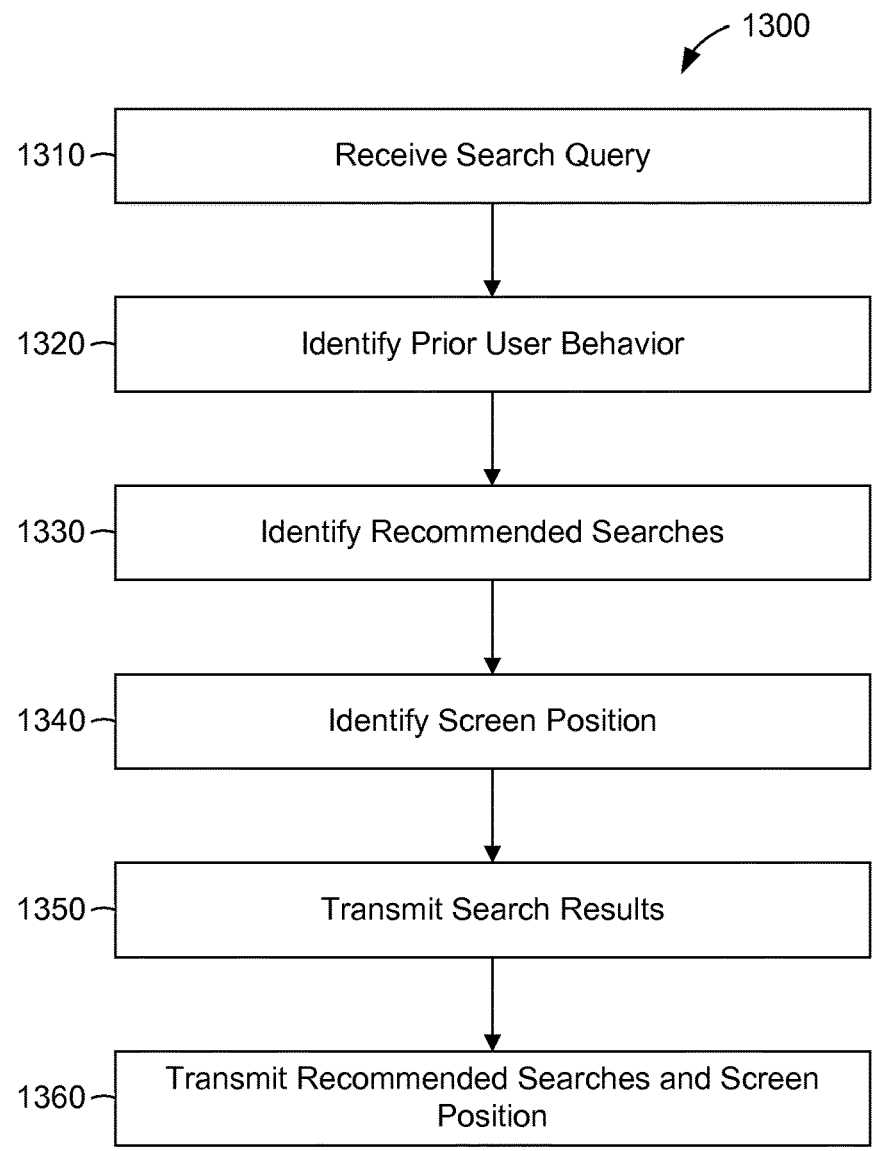
FIG. 13 is a flowchart illustrating operations of an application server in performing a method of search guidance, according to some example embodiments.

FIG. 13 is a flowchart illustrating operations of an application server 118 in performing a method 1300 of search guidance, according to some example embodiments. Operations in the method 1300 may be performed by the application server 118, using modules described above with respect to FIG. 2.

The application server 118 may receive a search query (operation 1310). Based on the search query, the application server 118 may identify the behavior of other users after running the same search query (operation 1320). For example, the application server 118 may determine searches that are frequently run after the received search query, searches that frequently lead to interactions with items that are frequently run after the received search query, and the like. Similarly, the application server 118 may identify patterns in the searching of the user from whom the search query was received. For example, this user may frequently search for items in a particular color, by a particular manufacturer, written by a particular author, etc.

In the operation 1330, recommended searches are identified. For example, recommended searches may be generated based on the usage patterns of the present user and other users. In some example embodiments, the recommended searches are generated based on advertising fees, promotions, seasons, etc. For example, a recommended search on St. Patrick's Day might add the word "green" to the search query. The application server 118 may also determine whether or not recommendations should be provided at all. For example, if a category has already been applied to the search query, the application server 118 may decide to present a recommended category, not to present a category recommendation, or not to present any recommendation at all. Similarly, if an aspect has already been applied to the search query, the application server 118 may decide to present a recommended aspect, not to present an aspect recommendation, or not to present any recommendation at all.

The number of recommendations, or whether or not to provide recommendations, may be determined based on the size of the user's display or the view type (e.g., list view or gallery view). For example, recommendations may be provided for 940 pixel tablets, but not for 760 pixel phones. As another example, recommendations may be provided in a list view, but not in a gallery view. Additionally, a list may be kept of search queries, users, or keywords for which recommendations are disabled. When the corresponding search query or keyword is received, or a query for a corresponding user is received, no recommendations may be generated.

As another element for consideration, the level of a category in a category tree may be considered. For example, a broad category near the top of a category tree may be preferred for generating recommendations while a narrow category near the bottom of the category tree is not. Accordingly, in some example embodiments, a category recommendation is made only when the identified category is a broad category, such as when, for example, the identified category is within two levels of the root node of a category tree. Likewise, aspect and category recommendations may be combined based on the level of an identified category. For example, when the identified category is not within two levels of the root node of the category tree and is not a leaf node, a single recommendation may be made that includes both the category and an identified aspect.

In the operation 1340, a screen position for the presentation of the recommendations may be generated. For example, if the present user often interacts only with the first five results presented, the recommended search queries may be presented at the sixth position. Alternatively, if an average user interacts with one of the first ten items presented after submitting a particular query, the recommended search queries may be presented at the eleventh position. These two approaches may be combined. For example, if the present user generally considers 20% more results than the average user, then the recommendations may be placed 20% lower in the result set than would be indicated by considering the average user alone.

A delay for the presentation of the recommendations may also be generated. For example, if the present user often interacts with a presented item within five seconds or else enters a new search or abandons the search, the recommended search queries may be presented after five seconds have elapsed. Alternatively, if an average user interacts with an item within ten seconds, the recommended search queries may be presented after ten seconds have elapsed. These two approaches may be combined. For example, if the present user generally interacts with an item 20% more quickly than the average user, then the delay may be 20% shorter than would be indicated by considering the average user alone.

The search results may be transmitted to the client machine 110 or 112 (operation 1350). The recommended searches, screen position, and delay may also be transmitted to the client machine 110 or 112 (operation 1360).

Figure 14:
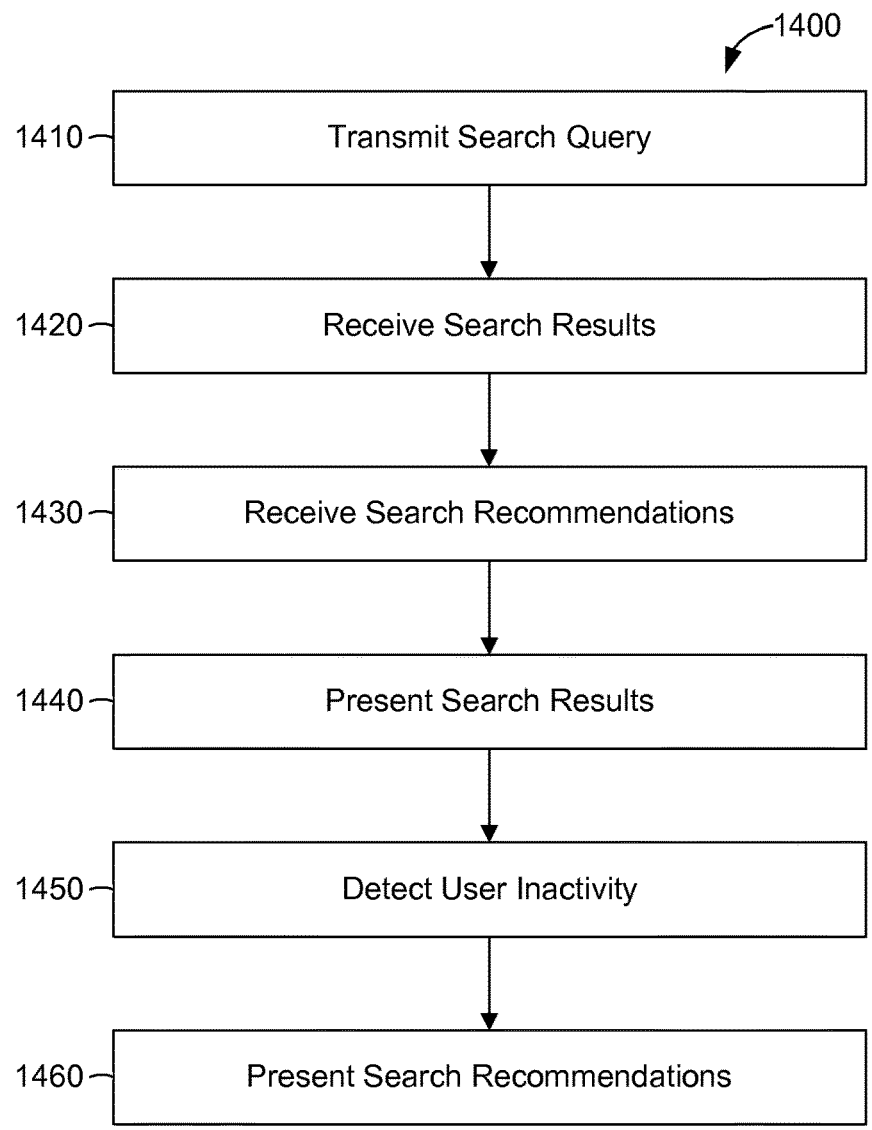
FIG. 14 is a flowchart illustrating operations of a client machine in performing a method of search guidance, according to some example embodiments.

FIG. 14 is a flowchart illustrating operations of the client machine 110 or 112 in performing a method 1400 of search guidance, according to some example embodiments. Operations in the method 1400 may be performed by the client machine 110 or 112, using modules described above with respect to FIG. 3.

In operation 1410, the client machine 110 or 112 may transmit a search query to the application server 118. The search query may have been manually created by a user, selected by a user from a list of generated search queries, or generated by the client machine 110 or 112 without user intervention.

In operation 1420, the client machine 110 or 112 may receive a set of search results responsive to the search query. The client machine 110 or 112 may also receive a set of search recommendations (operation 1430). The set of search recommendations may be generated by the application server 118 using the method 1300.

In operation 1440, the client machine 110 or 112 may present the set of search results and wait for further user activity. The search results may include links operable to display more information about a selected search result. After a period of time elapses and is detected by the client machine 110 or 112 (operation 1450), the client machine 110 or 112 may present the set of search recommendations to the user (operation 1460).

The effectiveness of the search guidance may also be tracked. For example, the number of interactions with the recommended queries may be identified and compared to the previous number of interactions with the same location in the search results. If users are more likely to interact with the recommended queries than later search results, that may indicate that the recommended queries are desired. Additionally or alternatively, the number of users that choose to clear the recommendation after activating it can be tracked. If many users choose to clear the recommendation, that may indicate that the recommended queries are not benefiting the users. A third element that may be tracked is the success rate of sessions in which the user activates a recommended query. An improvement in the success rate over sessions in which the user is not presented with recommended queries may indicate that recommended queries provide a benefit to the user or to the search result provider.

Figure 15:
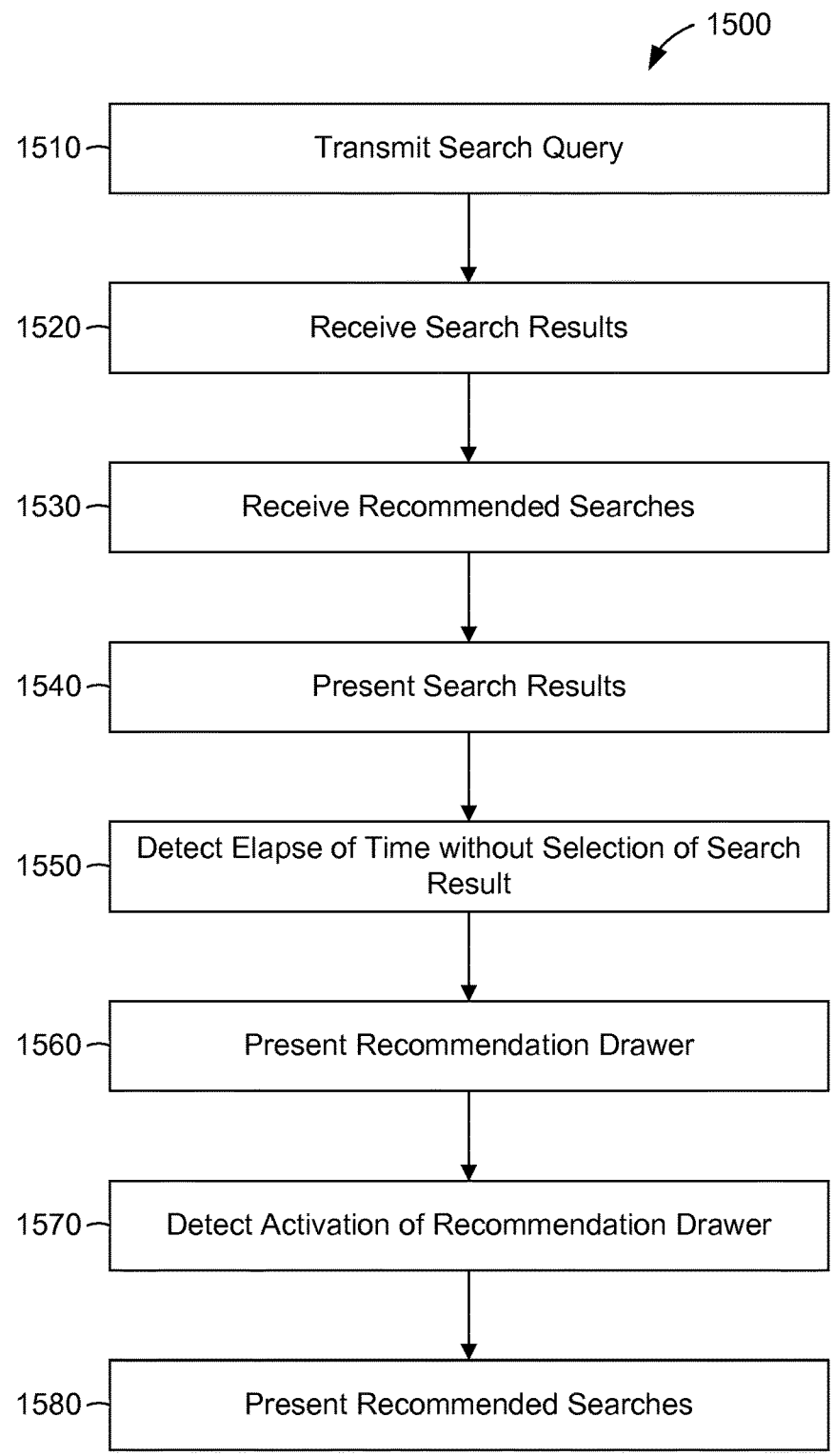
FIG. 15 is a flowchart illustrating operations of a client machine in performing a method of search guidance, according to some example embodiments.

FIG. 15 is a flowchart illustrating operations of a client machine 110 or 112 in performing methods of search guidance, according to some example embodiments. Operations in the method 1500 may be performed by the client machine 110 or 112, using modules described above with respect to FIG. 3.

The client machine 110 or 112 may transmit a search query (operation 1510) and receive search results for the search query from the application server 118 (operation 1520). The client machine 110 or 112 may also receive recommended searches (operation 1530). Received search queries may be presented (e.g., on a display device) to a user (operation 1540). An elapse of time without a user interacting with any of the presented search results may be detected (operation 1550). In some example embodiments, the elapse of time is based on different criteria such as, for example, an elapse of time without any user interaction, or an elapse of time with the mouse cursor hovering over a certain area of the display. Responsive to the elapse of time, a drawer operable to display search recommendations may be presented (operation 1560). The client machine 110 or 112 may detect an activation of the drawer (operation 1570) and present one or more of the received recommended searches (operation 1580). For example, the searches may be displayed as text or icons indicating the search, and the displayed UI element operable to run the search.

The client machine 110 or 112 may also determine whether or not a search query helper drawer should be provided at all. For example, if search query modifications have already been applied to the search query, the client machine 110 or 112 may decide to present a search query helper drawer with an altered visual appearance, or decide not to present any search query helper drawer at all. The size of the drawer, number of recommendations it contains, or whether or not to provide a search query helper drawer may be determined based on the size of the user's display or the view type (e.g., list view or gallery view). For example, a search query helper drawer may be provided for 940 pixel tablets, but not for 760 pixel phones. As another example, a search query helper drawer may be provided in a list view, but not in a gallery view. Additionally, a list may be kept of search queries, users, or keywords for which a search query helper drawer is disabled. When the corresponding search query or keyword is received, or a query for a corresponding user is received, no search query helper drawer may be generated.

The client machine 110 or 112 may also determine which recommendations within a search query helper drawer should be provided. For example, if a category has already been applied to the search query, the client machine 110 or 112 may decide to present a recommended category, not to present a category recommendation, or not to present any recommendation at all. Similarly, if an aspect has already been applied to the search query, the client machine 110 or 112 may decide to present a recommended aspect, not to present an aspect recommendation, or not to present any recommendation at all. The number of recommendations, or whether or not to provide recommendations, may be determined based on the size of the user's display or the view type (e.g., list view or gallery view). For example, five recommendations may be provided for 940 pixel tablets, but only three for 760 pixel phones. As another example, more recommendations may be in a list view than in a gallery view. In some example embodiments, determinations as to whether to present a recommended category and whether to present a recommended aspect may be made by the application server 118 and transmitted to the client machine 110 or 112. In other example embodiments, instructions as to how make the determinations are downloaded to the client machine 110 or 112 from the application server 118 prior to the making of the determinations by the client machine 110 or 112.

Figure 16:
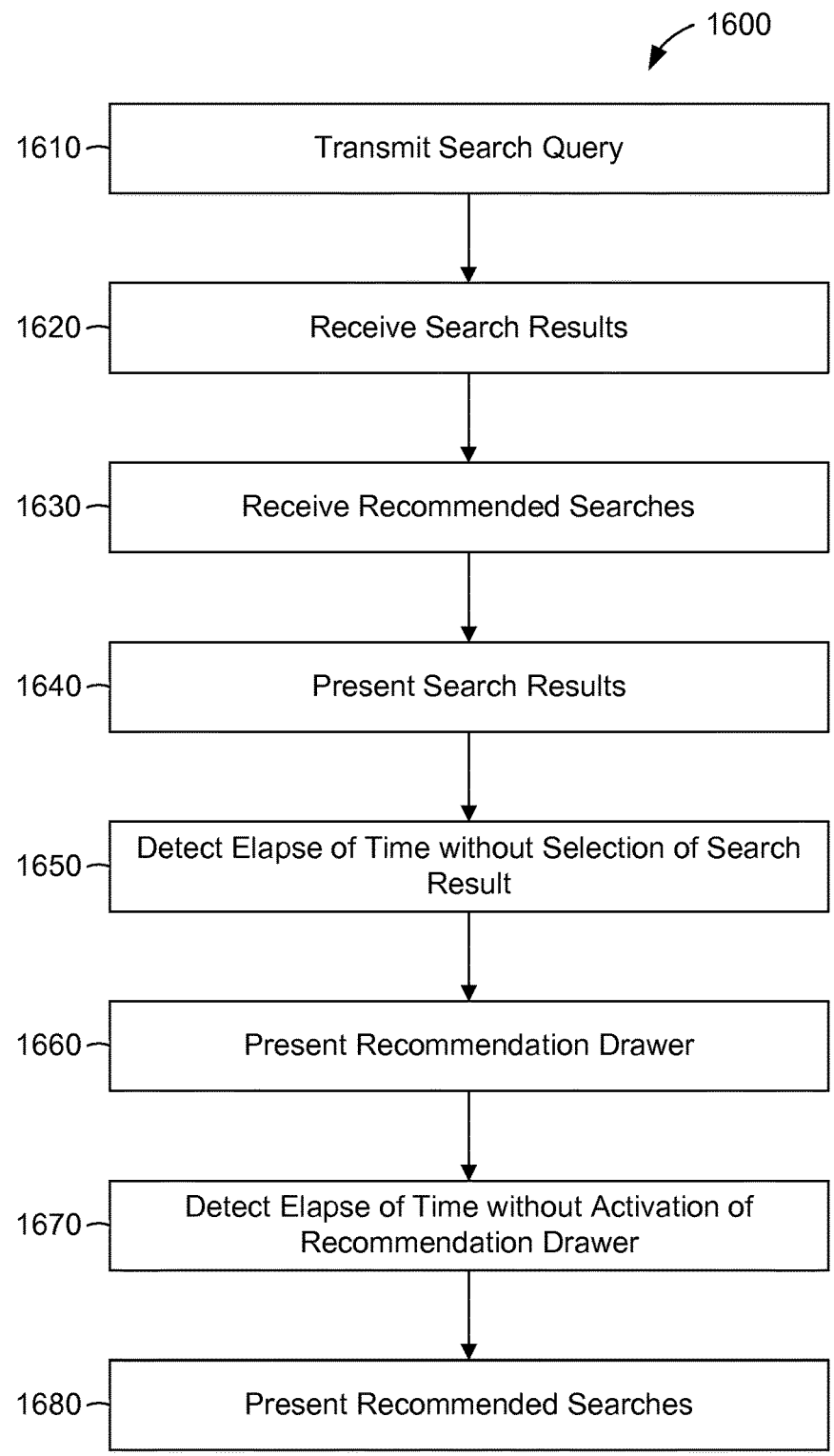
FIG. 16 is a flowchart illustrating operations of a client machine in performing a method of search guidance, according to some example embodiments.

FIG. 16 is a flowchart illustrating operations of the client machine 110 or 112 in performing methods of search guidance, according to some example embodiments. Operations in the method 1600 may be performed by the client machine 110 or 112, using modules described above with respect to FIG. 3.

The client machine 110 or 112 may transmit a search query (operation 1610) and receive search results for the search query from the application server 118 (operation 1620). The client machine 110 or 112 may also receive recommended searches (operation 1630). Received search queries may be presented (e.g., on a display device) to a user (operation 1640). An elapse of time without a user interacting with any of the presented search results may be detected (operation 1650). In some example embodiments, the elapse of time is based on different criteria such as, for example, an elapse of time without any user interaction, or an elapse of time with the mouse cursor hovering over a certain area of the display. Responsive to the elapse of time, a drawer operable to display search recommendations may be presented (operation 1660).

The client machine 110 or 112 may detect an elapse of time without activation of the drawer (operation 1670) and present one or more of the received recommended searches (operation 1680). In some example embodiments, the elapse of time is based on different criteria such as, for example, an elapse of time without any user interaction, an elapse of time without interaction with the drawer or a search result, or an elapse of time with the mouse cursor hovering over a certain area of the display.

The effectiveness of the search query helper drawer may also be tracked. For example, the number of interactions with the search query helper drawer may be identified and compared to the previous number of interactions with the same location in the search results. If users are more likely to interact with the search query helper drawer than later search results, that may indicate that the search query helper drawer is desired. Additionally or alternatively, the number of users that choose to close the search query helper drawer after opening it can be tracked. If many users choose to close the search query helper drawer, that may indicate that the search query helper drawer and its recommended queries are not benefiting the users. A third element that may be tracked is the success rate of sessions in which the user activates the search query helper drawer. An improvement in the success rate over sessions in which the user is not presented with a search query helper drawer may indicate that search query helper drawers provide a benefit to the user or to the search result provider.

Figure 17:
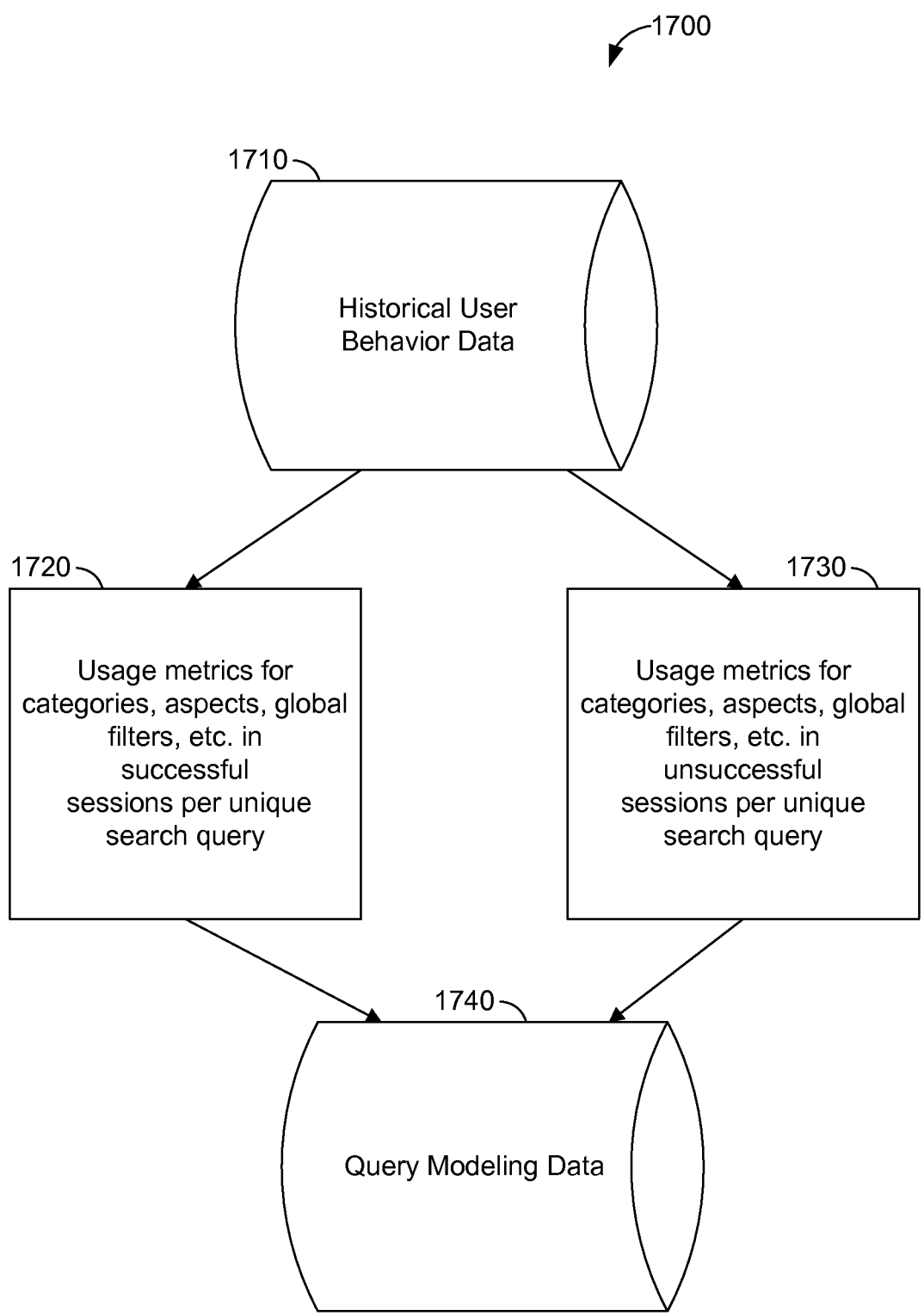
FIG. 17 is a block diagram illustrating the use of query data features in performing a method of search guidance, according to some example embodiments.

FIG. 17 is a block diagram 1700 illustrating the use of query data features in performing a method of search guidance, according to some example embodiments. A database 1710 stores historical user behavior data with data regarding the behavior of a number of users of the system. In one embodiment, data regarding the actions of all users are stored in the database 1710. From the historical user behavior data, usage metrics 1720 for categories, aspects, global filters, and the like in successful sessions for each unique search query may be extracted. Similarly, usage metrics 1730 for categories, aspects, global filters, and the like in unsuccessful sessions for each unique search query may be extracted. The usage metrics 1720 and 1730 may be used to model the categories, aspects, and global filters that may be desirable in future uses of the same query and stored in the database 1740 as query modeling data.

Figure 18:
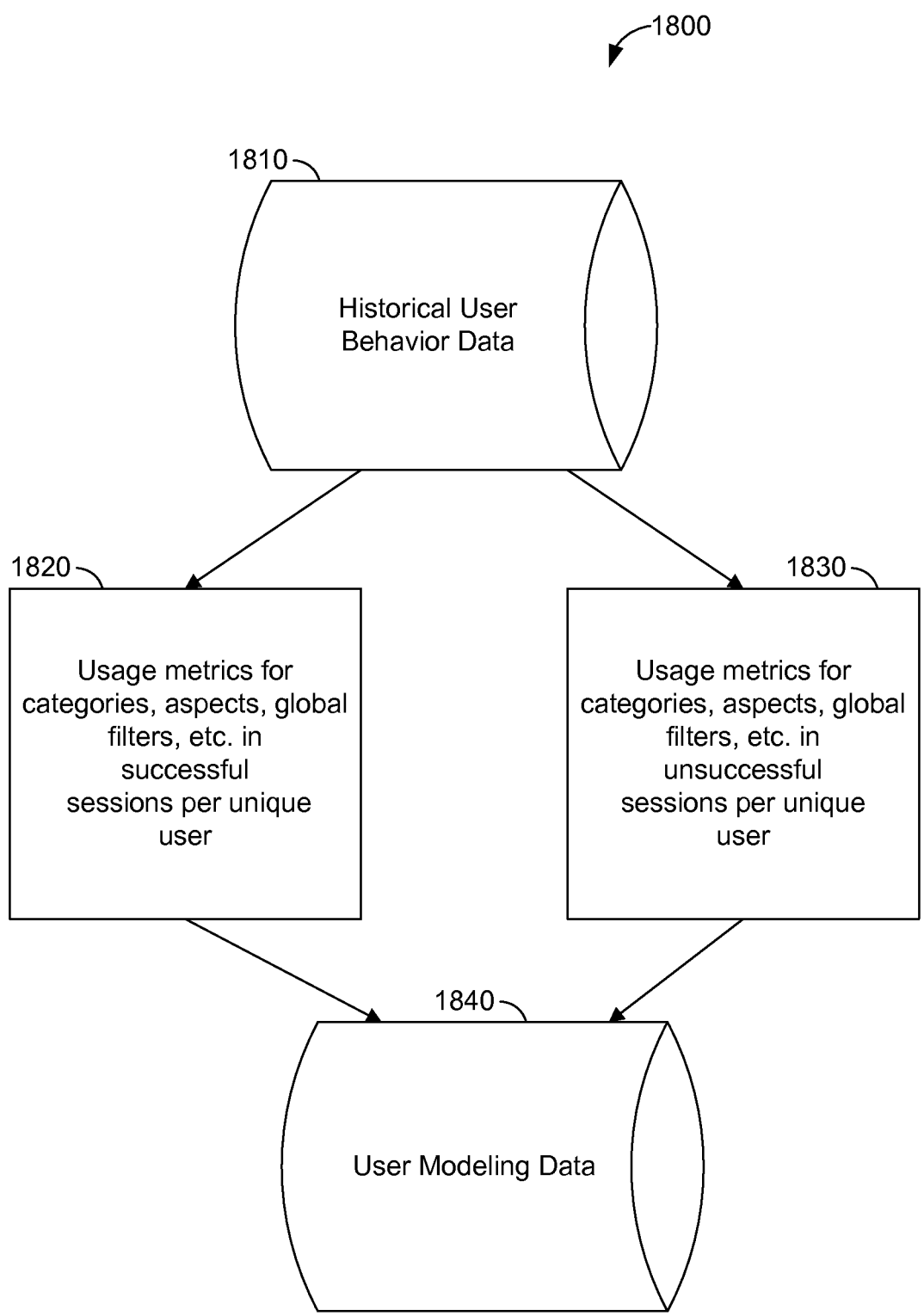
FIG. 18 is a block diagram illustrating the use of user data features in performing a method of search guidance, according to some example embodiments.

FIG. 18 is a block diagram 1800 illustrating the use of user data features in performing a method of search guidance, according to some example embodiments. A database 1810 stores historical user behavior data. From the historical user behavior data, usage metrics 1820 for categories, aspects, global filters, and the like in successful sessions for each unique user may be extracted. Similarly, usage metrics 1830 for categories, aspects, global filters, and the like in unsuccessful sessions for each unique user may be extracted. The usage metrics 1820 and 1830 may be used to model the categories, aspects, and global filters that may be desirable in future queries by the same user and stored in the database 1840 as user modeling data.

Figure 19:
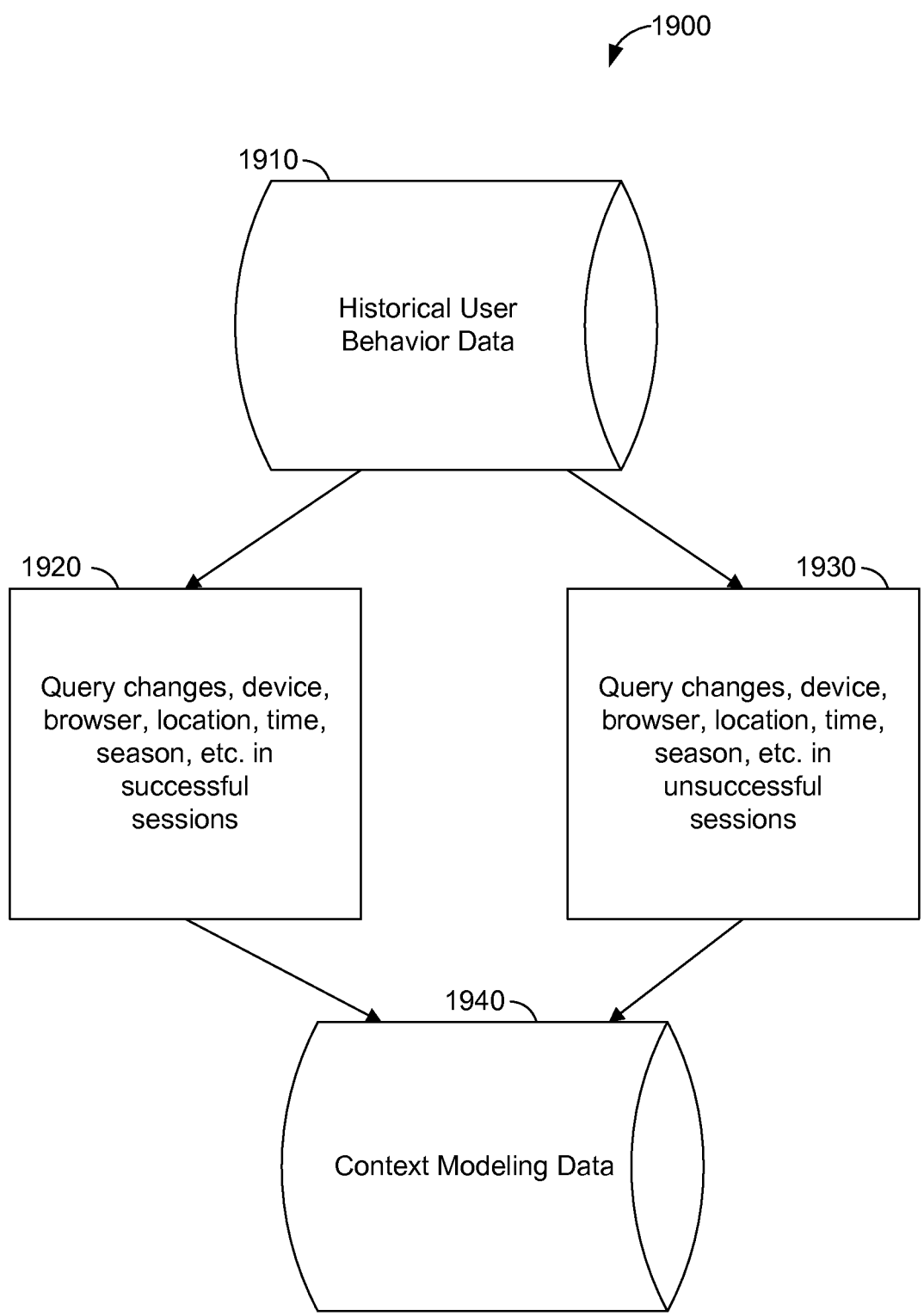
FIG. 19 is a block diagram illustrating the use of context data features in performing a method of search guidance, according to some example embodiments.

FIG. 19 is a block diagram 1900 illustrating the use of context data features in performing a method of search guidance, according to some example embodiments. A database 1910 stores historical user behavior data. From the historical user behavior data, usage metrics 1920 for query changes, device, browser, location, time, season, and the like in successful sessions may be extracted. Similarly, usage metrics 1930 for query changes, device, browser, location, time, season, and the like in unsuccessful sessions may be extracted. The usage metrics 1920 and 1930 may be used to model the categories, aspects, and global filters that may be desirable in future queries in similar contexts and stored in the database 1940 as context modeling data. Context modeling data include data related to the context of the query and are based on previous queries issued from the same context or similar contexts. For example, the context may include the browser from which the query was submitted, the season during which the query was generated, and so on. Based on historical context data, a search for jackets during the summer may often be followed by a related search for windbreakers, while a search for jackets during the winter may often be followed by a related search for coats. Thus, the query modeling data would suggest both coats and windbreakers as related searches, but the context modeling data would suggest an appropriate related search based on the season.

Figure 20:
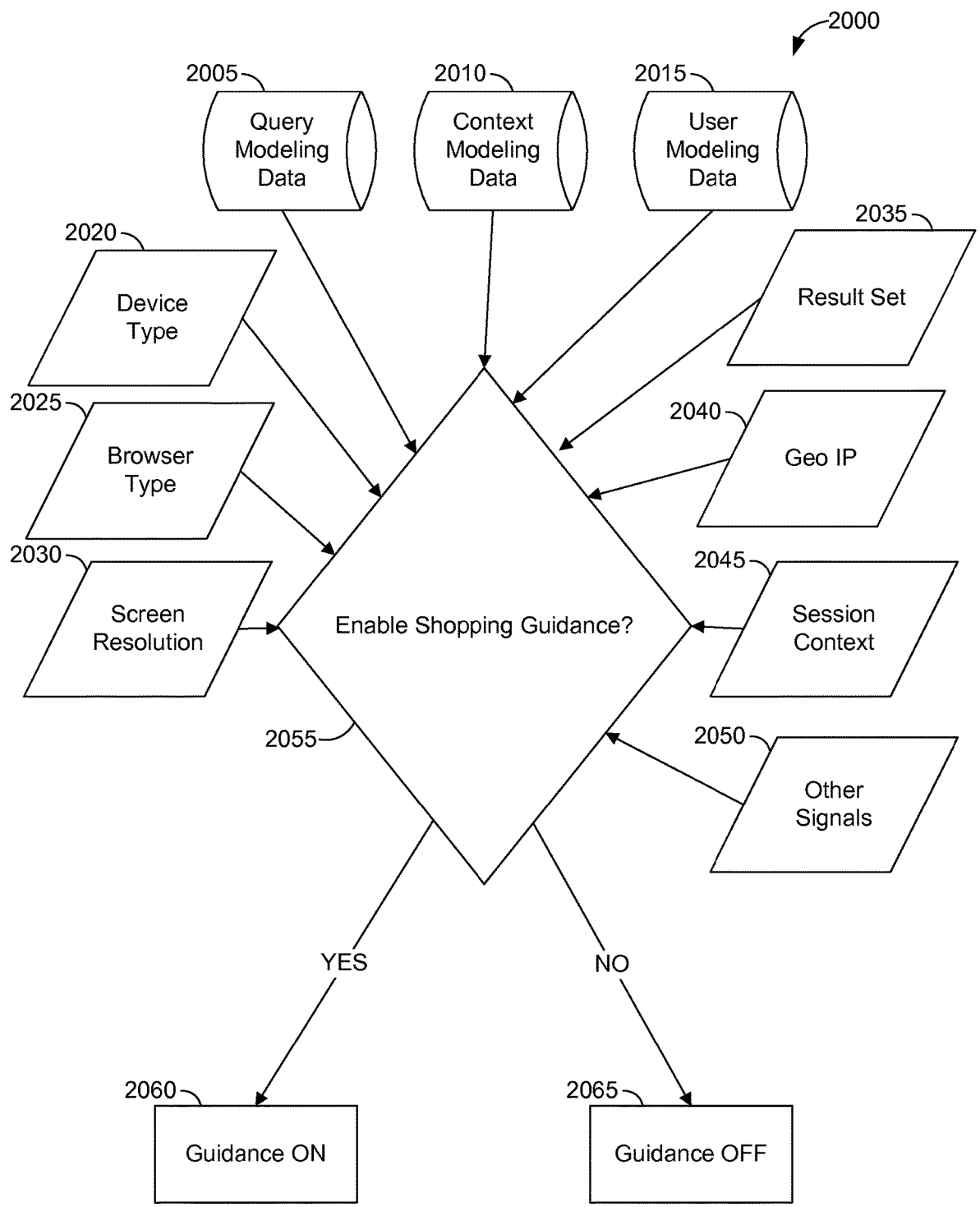
FIG. 20 is a block diagram illustrating factors that may be considered when deciding whether or not to present search recommendations, according to some example embodiments.

FIG. 20 is a block diagram 2000 illustrating factors that may be considered when deciding whether or not to present search recommendations, according to some example embodiments. The query modeling data 2005, context modeling data 2010, and user modeling data 2015 may be stored in separate databases, as shown, or in a combined database. The query modeling data 2005 may be derived from the historical user behavior data in database 1710 as shown in FIG. 17. The context modeling data 2010 may be derived from the historical user behavior data in database 1910 as shown in FIG. 19. The user modeling data 2015 may be derived from the historical user behavior data in database 1810 as shown in FIG. 18.

The device type 2020, browser type 2025, and screen resolution 2030 may be obtained from the client machine (e.g., client machine 110 or 112) that will display the search results and any provided shopping guidance. For example, the device type 2020 may indicate whether the client machine is a personal computer, a tablet, or a smart phone. The browser type 2025 may indicate the brand and version of the browser. For example, the browser type 2025 may indicate that the browser is Internet Explorer 8 or Chrome version 32.0. The browser type 2025 may indicate one or more features of the browser. For example, the browser type 2025 may indicate that the browser supports frames, pop-ups, or JavaScript. The screen resolution 2030 may indicate the resolution of the screen of a display device of the client machine, a set of available resolutions, or both. The size of the screen may be indicated independently of the screen resolution.

The result set 2035, geolocation 2040, session context 2045, and other signals 2050 may be obtained from the server machine determining the shopping guidance. For example, the result set 2035 may include results that are pre-identified as being amenable to shopping guidance. To illustrate, a set of search results that contains many results from a category may be amenable to search guidance that suggests limiting the results to that category. The geolocation 2040 may be an approximate location of the client machine generated based on the IP address of the client machine. For example, the client machine's IP address may be known to the server by virtue of communication between the two machines over the Internet. The client machine's IP address may be used to search a database of registered IP addresses to identify a physical address corresponding to the IP address. The physical address may be a street address, a town, a county, a state, or other political or geographic location. The session context 2045 may include session data for the communication between the server and the client machine such as, for example, the length of time the session has existed, the number of queries run in the session, the number of results sent during the session, and so on. The other signals 2050 may include other information known by the server and not directly related to the session with the client machine. For example, if the server load is high, that may be a factor against enabling shopping guidance.

Based on the inputs 2005-2050, the decision 2055 is made to enable or disable shopping guidance. If shopping guidance is enabled, guidance is set to "on" in process 2060. If shopping guidance is disabled, guidance is set to "off" in process 2065.

In some example embodiments, experiences are generated only for high-frequency keywords. A high-frequency keyword is a keyword that is searched for more than a minimum threshold of times in a period. For example, a high-frequency keyword may be a keyword that is searched in at least 1000 sessions per month. As another example, the threshold may be determined based on targeting a certain number of high-frequency keywords. For example, the threshold may be set so that the most-frequently-searched 60,000 keywords are considered to be high-frequency keywords. The success and usage rate of each category and aspect of a keyword may be determined. The most frequently used category and aspect may be identified and presented as experiences. The decision to present a category or an aspect may be based on whether the success rate for the category or aspect surpasses a threshold. For example, a particular keyword may be broadly associated with many aspects, such that each aspect has a success rate of no more than 10%. 10% may be below the threshold, and a decision to not present any aspect may be made. For another keyword, a particular aspect may have a success rate of 40%, which may be above the threshold, and the choice made to present the aspect.

The generated experiences for each keyword may be stored for later access (e.g., in a database) or generated dynamically each time a query is received. In embodiments in which the generated experiences are stored for later access, the generated experiences may be periodically updated based on the additional data gathered for the query and the user in the time elapsed since the previous generation of experiences. For example, experiences may be generated and stored for high-frequency keywords and updated on a weekly basis.

A database storing experiences for search keywords may store a number of data fields for each keyword or query. For example, each of the following may be stored: the number of sessions in which the keyword or query was used ("TotalSessions"), the percentage of those sessions that resulted in a user interacting with an item ("SrpEventsRatio"), the additional number of categories used in the average successful search over the average unsuccessful search ("CategoryEventsRatio"), the average number of aspect constraints used in successful sessions ("SuccessAspectEvents"), the average number of pages of results viewed in successful sessions ("SuccessPaginationEvents"), the number of successful sessions ("SuccessSrpEvents"), the average number of global filter constraints used in successful sessions ("SuccessGlobalFilterEvents"), the percentage of sessions using a global filter that resulted in a user interacting with an item ("GlobalFilterEventsRatio"), the additional number of pages viewed in the average successful search over the average unsuccessful search ("PaginationEventsRatio"), the average number of category constraints used in successful sessions ("SuccessCategoryEvents"), the additional number of aspects used in the average successful search over the average unsuccessful search ("AspectEventsRatio").

A number of data fields regarding a recommendation may be stored and transmitted to the client machine 110 or 112. For example, each of the following may be stored for a recommended category: the total number of uses of the query ("total_imp"), the percentage of the time that successes resulted from the use of this category ("ctr"), the number of buy-it-now events that resulted from the use of this category ("bin"), the percentage of the time that this category was used for the query ("imp_per"), the number of successes with this category ("clicks"), the number of uses of this category ("imp"), the identifier of the category ("appliedCategory"), and a uniform resource locator ("URL") for an image for the category ("url").

The image for a category may be selected manually or automatically. An image for a category may be automatically selected from items in that category by using criteria such as click-through-rate to select the image for an item that is often viewed, the popularity of an item that is often purchased, or the contrast, brightness, background color (e.g., white), and temperature of the image to select an image that is more likely to contain an easily-recognizable object. Images may be periodically updated. For example, an automatically-selected category image may be re-selected on a weekly or monthly basis from currently-available items.

As another example, each of the following may be stored for a recommended aspect type: the total number of uses of the query ("total_imp"), the percentage of the time the use of the aspect type resulted in a success ("n_ctr"), the name of the aspect type ("aspectName"), the number of buy-it-now events associated with the aspect type ("n_bin"), the percentage of the time the aspect type was used ("n_imp_per"), the number of times the aspect type was used ("n_imp"), the number of successes generated using this aspect type ("n_clicks"). An aspect type is a category of aspects that may include one or more aspect values. For example, "Brand" and "Shoe Size" may be aspect types, while "Nike," "Adidas," and "Size 12" would be specific aspects.

Continuing with data that may be stored or provided for a recommendation, each of the following may be stored for a recommended aspect: the total number of uses of the query ("total_imp"), the value of the aspect ("value"), the number of uses of the aspect ("v_imp"), the number of successes with the aspect ("v_clicks"), the number of buy-it-now events resulting from the aspect ("v_bin"), and a URL of an image representing the aspect ("url").

The decision about which categories and aspects to recommend may be based on thresholds corresponding to any of these values or combination(s) thereof. Some example thresholds include: CategoryEventsRatio>=0, AspectEventsRatio>=0, SuccessCategoryEvents>=0, SuccessAspectEvents>=0, imp_per>=50%, and imp_per>=0%.

Information about the recommended searches may be transferred from the application server to the client machine 110 or 112 via Javascript object notation ("JSON") data objects or any other data format.

Figure 21:
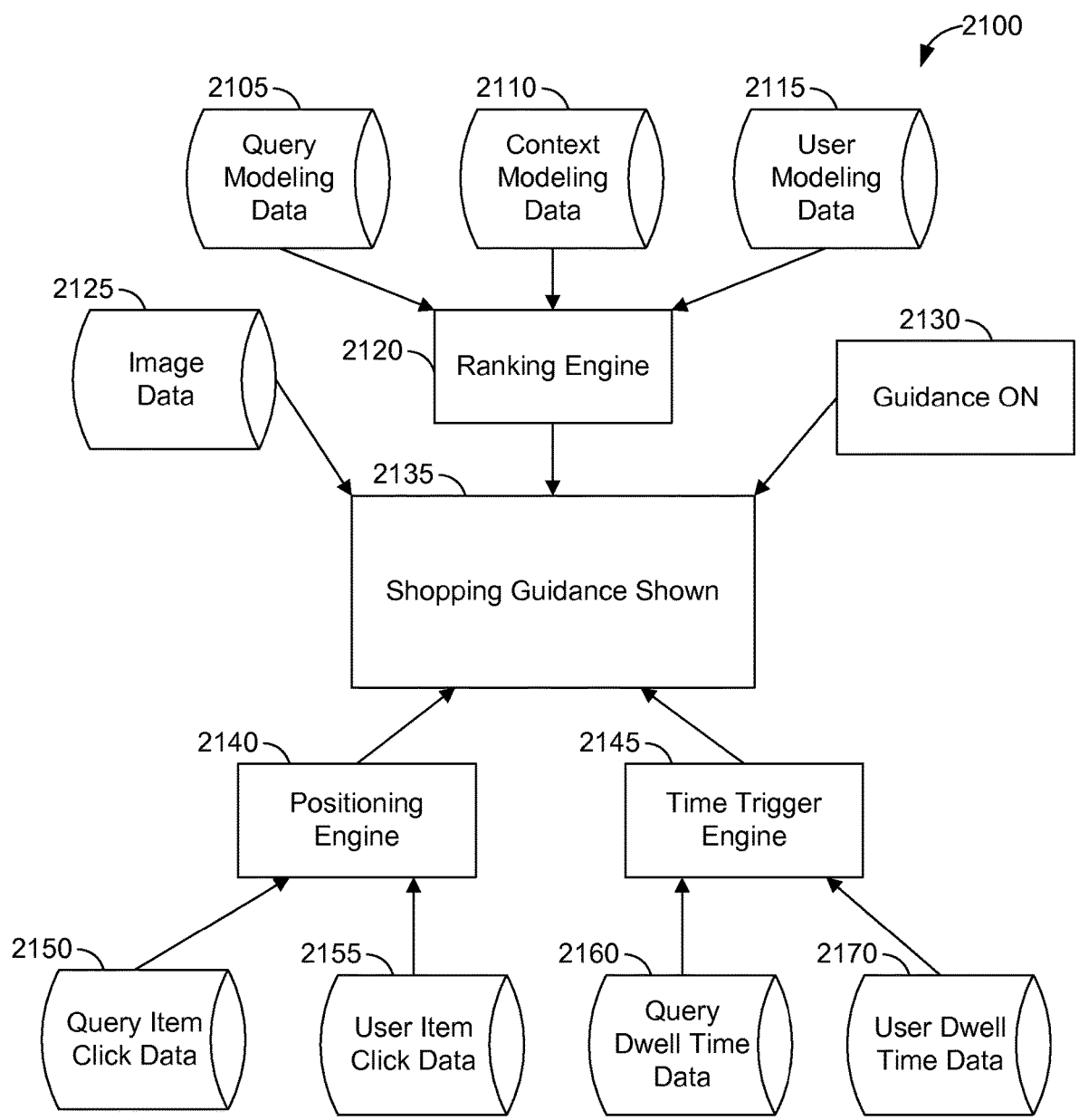
FIG. 21 is a block diagram illustrating factors that may be considered when deciding which search recommendations to present, where to present them, and when to present them, according to some sample embodiments.

FIG. 21 is a block diagram 2100 illustrating factors that may be considered when deciding which search recommendations to present, where to present them, and when to present them, according to some sample embodiments. The query item click data 2150 is data for when users click on items generated for the query. The user item click data 2155 is data for when this user clicks on items. The query item click data 2150 and the user item click data 2155 may be considered by the positioning engine 2140 in determining where to position the recommended search queries or the search query helper drawer. The query dwell time data 2160 is the average time other users have spent viewing the results of similar queries. The user dwell time data 2170 is the average time this user has spent viewing the results of prior queries. The query dwell time data 2160 and the user dwell time data 2170 may be used by a time trigger engine 2145 to determine the delay in presenting the search recommendations or the search query helper drawer.

The query modeling data 2105, context modeling data 2110, and user modeling data 2115 may be used as inputs to a ranking engine 2120 that determines which recommendations to present, either directly or from a search query helper drawer. Also, the image data 2125 may be used to determine the images to display with each recommendation or with the search query helper drawer. Note that the search query helper drawer, as well as each recommendation, may be presented as an image, as a text-based button, as a hyperlink, or any other operable element. In some example embodiments, shopping guidance results are only shown if the "Guidance ON" 2130 data value is set. Based on the inputs from the ranking engine 2120, the image data 2125, the "Guidance ON" 2130 data value, the positioning engine 2140, and the time trigger engine 2145, the process 2135 may determine whether to present guidance, which guidance to present, how to present it, and when to present it.

According to various example embodiments, one or more of the methodologies described herein may facilitate search guidance. Hence, one or more the methodologies described herein may facilitate retrieval and presentation of results of interest to a user without requiring the user to explicitly craft a series of queries. Furthermore, one or more of the methodologies described herein may more efficiently use the screen real estate of a client device.

When these effects are considered in aggregate, one or more of the methodologies described herein may obviate a need for certain efforts or resources that otherwise would be involved in searching. Efforts expended by a user in identifying relevant queries may be reduced by one or more of the methodologies described herein. Computing resources used by one or more machines, databases, or devices (e.g., within the client-server system 100) may similarly be reduced. Examples of such computing resources include processor cycles, network traffic, memory usage, data storage capacity, power consumption, and cooling capacity.

Modules, Components and Logic

Certain embodiments are described herein as including logic or a number of components, modules, or mechanisms. Modules may constitute either software modules (e.g., code embodied on a non-transitory machine-readable medium) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 22:
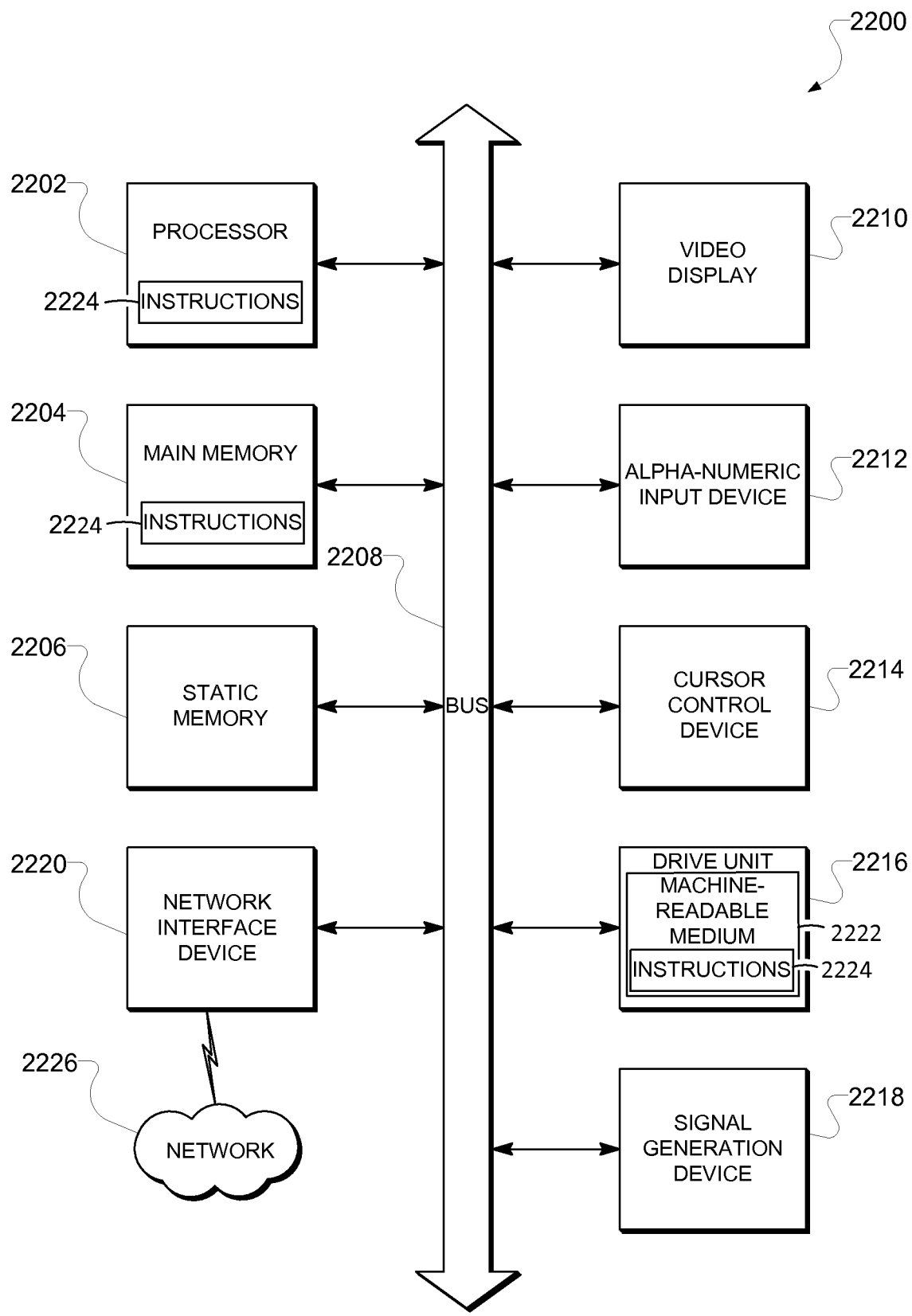
FIG. 22 is a block diagram illustrating components of a machine, according to some example embodiments, able to read instructions from a machine-readable medium and perform any one or more of the methodologies discussed herein.

FIG. 22 is a block diagram of machine in the example form of a computer system 2200 within which instructions may be executed for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a tablet, a wearable device (e.g., a smart watch or smart glasses), a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 2200 includes a processor 2202 (e.g., a central processing unit (CPU), a graphics processing unit (GPU) or both), a main memory 2204 and a static memory 2206, which communicate with each other via a bus 2208. The computer system 2200 may further include a video display unit 2210 (e.g., a liquid crystal display (LCD) or a cathode ray tube (CRT)). The computer system 2200 also includes an alphanumeric input device 2212 (e.g., a keyboard or a touch-sensitive display screen), a user interface (UI) navigation (or cursor control) device 2214 (e.g., a mouse), a disk drive unit 2216, a signal generation device 2218 (e.g., a speaker) and a network interface device 2220.

Machine-Readable Medium

The disk drive unit 2216 includes a machine-readable medium 2222 on which is stored one or more sets of data structures and instructions 2224 (e.g., software) embodying or utilized by any one or more of the methodologies or functions described herein. The instructions 2224 may also reside, completely or at least partially, within the main memory 2204 and/or within the processor 2202 during execution thereof by the computer system 2200, the main memory 2204 and the processor 2202 also constituting machine-readable media.

While the machine-readable medium 2222 is shown in an example embodiment to be a single medium, the term "machine-readable medium" may include a single medium or multiple media (e.g., a centralized or distributed database, and/or associated caches and servers) that store the one or more data structures or instructions 2224. The term "machine-readable medium" shall also be taken to include any tangible medium that is capable of storing, encoding or carrying instructions for execution by the machine and that cause the machine to perform any one or more of the methodologies of the present inventive subject matter, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 2224 may further be transmitted or received over a communications network 2226 using a transmission medium. The instructions 2224 may be transmitted using the network interface device 2220 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method for presenting recommended searches on search interfaces, the method comprising:
   receiving, at a client machine, a set of recommended searches associated with a set of search results of a search query;
   causing display of the set of search results;
   causing display of a search query helper drawer after a time has elapsed, wherein the time is determined dynamically based on past user interaction of search results from the query;
   the search query helper drawer that is caused to be displayed after the time is configured to subsequently present the set of recommended searches that were previously not displayed, wherein the search query helper drawer is available to be activated after the time has elapsed via a user activation to cause display of the set of recommended searches;
   receiving the user activation of the search query helper drawer; and
   in response to receiving the user activation, causing display of the set of recommended searches in the search query helper drawer.

2. The method of claim 1, causing display of the search query helper drawer at a particular location on a screen.

3. The method of claim 1, wherein the user activation is one of the following: a click on the search query helper drawer, a tap on the search query helper drawer, hovering over the search query helper drawer, and a keypress to open the search query helper drawer.

4. The method of claim 1, wherein the predetermined time is determined based on one of the following:
   a user-specified fixed time;
   a set of actions of other users after submitting a same search query as the search query associated with the set of search results and the set of recommended searches, and
   prior actions of a user after submitting other search queries, wherein the user submitted the search query associated with the set of search results and the set of recommended searches.

5. The method of claim 1, wherein the predetermined time is a first delay associated with a second delay, wherein the second delay is a recommended search query delay, wherein the set of recommended searches are displayed in the search query helper drawer after the recommended search query delay.

6. The method of claim 1, further causing display of an animation of the search query helper drawer, wherein the animation comprises:
   a first animation of opening a drawer, an open drawer indicating an activation of the search query helper drawer, wherein the set of recommended searches are displayed in the search query helper drawer inside of the open drawer based on the first animation; or
   a second animation of closing the drawer, a closed drawer indicating a deactivation of the search query helper drawer.

7. The method of claim 6, wherein the set of recommended searches are displayed as an overlay over the set of search results for the search query; or wherein the set of recommended searches are displayed in the search query helper drawer inside of the open drawer based on the first animation.

8. The method of claim 1, wherein a particular location for causing display of the search query helper drawer is determined dynamically on a query-by-query basis.

9. The method of claim 1, the method further comprising:
tracking interactions with the search query helper drawer as an indication of success rate of the set of recommended searches.

10. A system for presenting recommended searches on search interfaces comprising:
one or more processors; and
a machine-readable hardware storage device coupled with the one or more processors, the machine-readable hardware storage device storing instructions that, when executed by the one or more processors, cause the system to perform operations comprising:
receiving, at a client machine, a set of recommended searches associated with a set of search results of a search query;
causing display of the set of search results;
causing display of a search query helper drawer after a time has elapsed, wherein the time is determined dynamically based on past user interaction of search results from the query;
the search query helper drawer that is caused to be displayed after the time has elapsed is configured subsequently to present the set of recommended searches that were previously not displayed, wherein the search query helper drawer is available to be activated after the time has elapsed via a user activation to cause display of the set of recommended searches;
receiving the user activation of the search query helper drawer; and
in response to receiving the user activation, causing display of the set of recommended searches in the search query helper drawer.

11. The system of claim 10, the operations further comprising causing display of the search query helper drawer at a particular location on a screen.

12. The system of claim 10, wherein the user activation is one of the following: a click on the search query helper drawer, a tap on the search query helper drawer, hovering over the search query helper drawer, and a keypress to open the search query helper drawer.

13. The system of claim 10, wherein the predetermined time is determined based on one of the following:
a user-specified fixed time,
a set of actions of other users after submitting a same search query as the search query associated with the set of search results and the set of recommended searches, and
prior actions of a user after submitting other search queries, wherein the user submitted the search query associated with the set of search results and the set of recommended searches.

14. The system of claim 10, wherein the predetermined time is a first delay associated with a second delay, wherein the second delay is a recommended search query delay, wherein the set of recommended searches are displayed in the search query helper drawer after the recommended search query delay.

15. The system of claim 10, the operations further causing display of an animation of the search query helper drawer, wherein the animation comprises:

a first animation of opening a drawer, an open drawer indicating an activation of the search query helper drawer, wherein the set of recommended searches are displayed in the search query helper drawer inside of the open drawer based on the first animation; or
a second animation of closing the drawer, a closed drawer indicating a deactivation of the search query helper drawer.

16. The system of claim 15, wherein the set of recommended searches are displayed as an overlay over the set of search results for the search query; or wherein the set of recommended searches are displayed in the search query helper drawer inside of the open drawer based on the first animation.

17. A non-transitory machine-readable hardware storage device for presenting recommended searches on search interfaces storing a set of instructions that, when executed by a processor of a machine, causes the machine to perform operations comprising:
receiving, at a client machine, a set of recommended searches associated with a set of search results of a search query;
causing display of the set of search results;
causing display of a search query helper drawer after a time has elapsed, wherein the time is determined dynamically based on past user interaction of search results from the query;
the search query helper drawer that is caused to be displayed after the predetermined time has elapsed is configured to subsequently present the set of recommended searches that previously not displayed, wherein the search query helper drawer available to be activated is after the predetermined time has elapsed via a user activation to cause display of the set of recommended searches;
receiving the user activation of the search query helper drawer; and
in response to receiving the user activation, causing display of the set of recommended searches in the search query helper drawer.

18. The storage device of claim 17, the operations further comprising causing display of the search query helper drawer at a particular location on a screen.

19. The storage device of claim 18, wherein the predetermined time is determined based on one of the following:
a user-specified fixed time,
a set of actions of other users after submitting a same search query as the search query associated with the set of search results and the set of recommended searches, and
prior actions of a user after submitting other search queries, wherein the user submitted the search query associated with the set of search results and the set of recommended searches.

20. The storage device of claim 18, wherein the predetermined time is a first delay associated with a second delay, wherein the second delay is a recommended search query delay, wherein the set of recommended searches are displayed in the search query helper drawer after the recommended search query delay.

* * * * *